(12) United States Patent
Abedini et al.

(10) Patent No.: US 11,601,188 B2
(45) Date of Patent: Mar. 7, 2023

(54) REPEATER MECHANICAL BEAM STEERING

(71) Applicant: QUALCOMM Incorporated, San Diego, CA (US)

(72) Inventors: Navid Abedini, Basking Ridge, NJ (US); Junyi Li, Franklin Park, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/195,239

(22) Filed: Mar. 8, 2021

(65) Prior Publication Data
US 2021/0306064 A1  Sep. 30, 2021

Related U.S. Application Data

(60) Provisional application No. 63/000,170, filed on Mar. 26, 2020.

(51) Int. Cl.
*H04B 7/155* (2006.01)
*H04B 7/0426* (2017.01)
*H01Q 3/08* (2006.01)

(52) U.S. Cl.
CPC ......... *H04B 7/15507* (2013.01); *H04B 7/043* (2013.01); *H04B 7/15542* (2013.01); *H01Q 3/08* (2013.01)

(58) Field of Classification Search
CPC ............... H04B 7/15507; H04B 7/043; H04B 7/15542; H04B 7/0617; H04B 7/15528; H01Q 3/08
See application file for complete search history.

(56) References Cited

U.S. PATENT DOCUMENTS

| | | | |
|---|---|---|---|
| 10,553,943 B2 * | 2/2020 | Tran | H01Q 3/24 |
| 2018/0337725 A1 * | 11/2018 | Stephenne | H04B 7/2603 |
| 2021/0105789 A1 * | 4/2021 | Freda | H04W 4/40 |
| 2021/0385896 A1 * | 12/2021 | Kim | H04W 36/0027 |
| 2022/0086941 A1 * | 3/2022 | Huang | H04W 36/0069 |

* cited by examiner

*Primary Examiner* — Hashim S Bhatti
(74) *Attorney, Agent, or Firm* — Harrity & Harrity LLP/Qualcomm Incorporated

(57) ABSTRACT

Various aspects of the present disclosure generally relate to wireless communication. In some aspects, a repeater may identify one or more parameters for mechanical beam steering. The repeater may perform mechanical beam steering based at least in part on the one or more parameters. Numerous other aspects are provided.

30 Claims, 12 Drawing Sheets

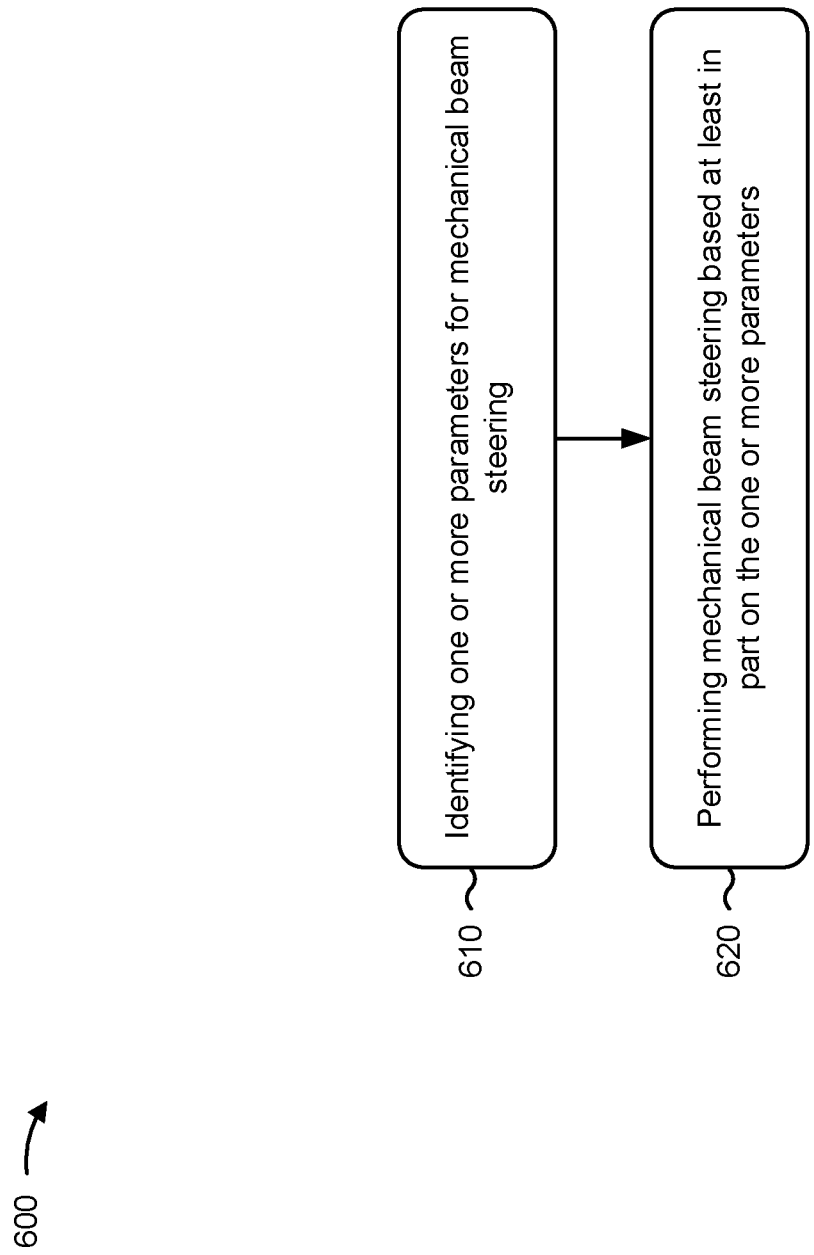

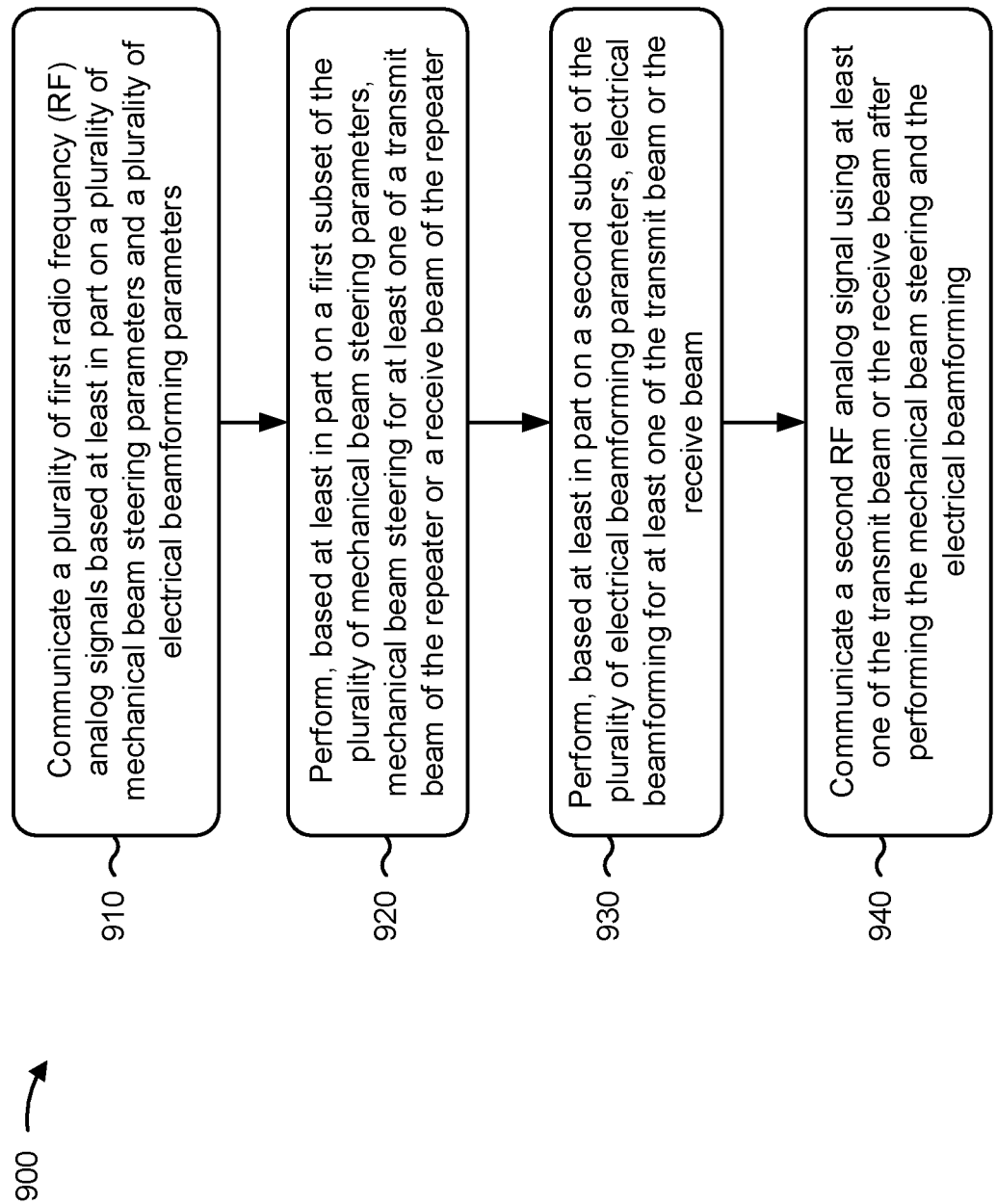

REPEATER MECHANICAL BEAM STEERING

CROSS-REFERENCE TO RELATED APPLICATION

This Patent Applications claims priority to U.S. Provisional Patent Application No. 63/000,170, filed on Mar. 26, 2020, entitled "REPEATER MECHANICAL BEAM STEERING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for repeater mechanical beam steering.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a repeater, may include identifying one or more parameters for mechanical beam steering; and performing mechanical beam steering based at least in part on the one or more parameters.

In some aspects, a method of wireless communication, performed by a base station (BS), may include identifying one or more parameters for mechanical beam steering for a repeater; and transmitting, to the repeater, an indication of the one or more parameters for mechanical beam steering.

In some aspects, a repeater for wireless communication may include a memory and one or more processors operatively coupled to the memory. The memory and the one or more processors may be configured to identify one or more parameters for mechanical beam steering; and perform mechanical beam steering based at least in part on the one or more parameters.

In some aspects, a BS for wireless communication may include a memory and one or more processors operatively coupled to the memory. The memory and the one or more processors may be configured to identify one or more parameters for mechanical beam steering for a repeater; and transmit, to the repeater, an indication of the one or more parameters for mechanical beam steering.

In some aspects, a non-transitory computer-readable medium may store one or more instructions for wireless communication. The one or more instructions, when executed by one or more processors of a repeater, may cause the one or more processors to identify one or more parameters for mechanical beam steering; and perform mechanical beam steering based at least in part on the one or more parameters.

In some aspects, a non-transitory computer-readable medium may store one or more instructions for wireless communication. The one or more instructions, when executed by one or more processors of a BS, may cause the one or more processors to identify one or more parameters for mechanical beam steering for a repeater; and transmit, to the repeater, an indication of the one or more parameters for mechanical beam steering.

In some aspects, an apparatus for wireless communication may include means for identifying one or more parameters for mechanical beam steering; and means for performing mechanical beam steering based at least in part on the one or more parameters.

In some aspects, an apparatus for wireless communication may include means for identifying one or more parameters for mechanical beam steering for a repeater; and means for transmitting, to the repeater, an indication of the one or more parameters for mechanical beam steering.

In some aspects, a method of wireless communication performed by a repeater includes receiving, from a BS or a network controller in a wireless network, an indication of a mechanical beam steering configuration, the mechanical beam steering configuration comprising one or more parameters for mechanical beam steering; and performing mechanical beam steering based at least in part on the one or more parameters.

In some aspects, a method of wireless communication performed by a repeater includes communicating a plurality of first radio frequency (RF) analog signals based at least in part on a plurality of mechanical beam steering parameters and a plurality of electrical beamforming parameters; performing, based at least in part on a first subset of the plurality of mechanical beam steering parameters, mechanical beam steering for at least one of a transmit beam of the repeater or a receive beam of the repeater; performing, based at least in part on a second subset of the plurality of electrical beamforming parameters, electrical beamforming for at least one of the transmit beam or the receive beam; and communicating a second RF analog signal using at least one of the transmit beam or the receive beam after performing the mechanical beam steering and the electrical beamforming.

In some aspects, a repeater for wireless communication includes a memory; and one or more processors operatively coupled to the memory, the memory and the one or more processors configured to: receive, from a BS or a network controller in a wireless network, an indication of a mechanical beam steering configuration, the mechanical beam steering configuration comprising one or more parameters for mechanical beam steering; and perform mechanical beam steering based at least in part on the one or more parameters.

In some aspects, a repeater for wireless communication includes a memory; and one or more processors operatively coupled to the memory, the memory and the one or more processors configured to: communicate a plurality of first RF analog signals based at least in part on a plurality of mechanical beam steering parameters and a plurality of electrical beamforming parameters; perform, based at least in part on a first subset of the plurality of mechanical beam steering parameters, mechanical beam steering for at least one of a transmit beam of the repeater or a receive beam of the repeater; perform, based at least in part on a second subset of the plurality of electrical beamforming parameters, electrical beamforming for at least one of the transmit beam or the receive beam; and communicate a second RF analog signal using at least one of the transmit beam or the receive beam after performing the mechanical beam steering and the electrical beamforming.

In some aspects, a non-transitory computer-readable medium may store one or more instructions for wireless communication. The one or more instructions, when executed by one or more processors of a repeater, may cause the repeater to receive, from a BS or a network controller in a wireless network, an indication of a mechanical beam steering configuration, the mechanical beam steering configuration comprising one or more parameters for mechanical beam steering; and perform mechanical beam steering based at least in part on the one or more parameters.

In some aspects, a non-transitory computer-readable medium may store one or more instructions for wireless communication. The one or more instructions, when executed by one or more processors of a repeater, may cause the repeater to communicate a plurality of first RF analog signals based at least in part on a plurality of mechanical beam steering parameters and a plurality of electrical beamforming parameters; perform, based at least in part on a first subset of the plurality of mechanical beam steering parameters, mechanical beam steering for at least one of a transmit beam of the repeater or a receive beam of the repeater; perform, based at least in part on a second subset of the plurality of electrical beamforming parameters, electrical beamforming for at least one of the transmit beam or the receive beam; and communicate a second RF analog signal using at least one of the transmit beam or the receive beam after performing the mechanical beam steering and the electrical beamforming.

In some aspects, an apparatus for wireless communication may include means for receiving, from a BS or a network controller in a wireless network, an indication of a mechanical beam steering configuration, the mechanical beam steering configuration comprising one or more parameters for mechanical beam steering; and means for performing mechanical beam steering based at least in part on the one or more parameters.

In some aspects, an apparatus for wireless communication may include means for communicating a plurality of first RF analog signals based at least in part on a plurality of mechanical beam steering parameters and a plurality of electrical beamforming parameters; means for performing, based at least in part on a first subset of the plurality of mechanical beam steering parameters, mechanical beam steering for at least one of a transmit beam of the apparatus or a receive beam of the apparatus; means for performing, based at least in part on a second subset of the plurality of electrical beamforming parameters, electrical beamforming for at least one of the transmit beam or the receive beam; and means for communicating a second RF analog signal using at least one of the transmit beam or the receive beam after performing the mechanical beam steering and the electrical beamforming.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a repeater, in accordance with the present disclosure.

FIGS. 8 and 9 are diagrams illustrating example processes performed, for example, by a repeater, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
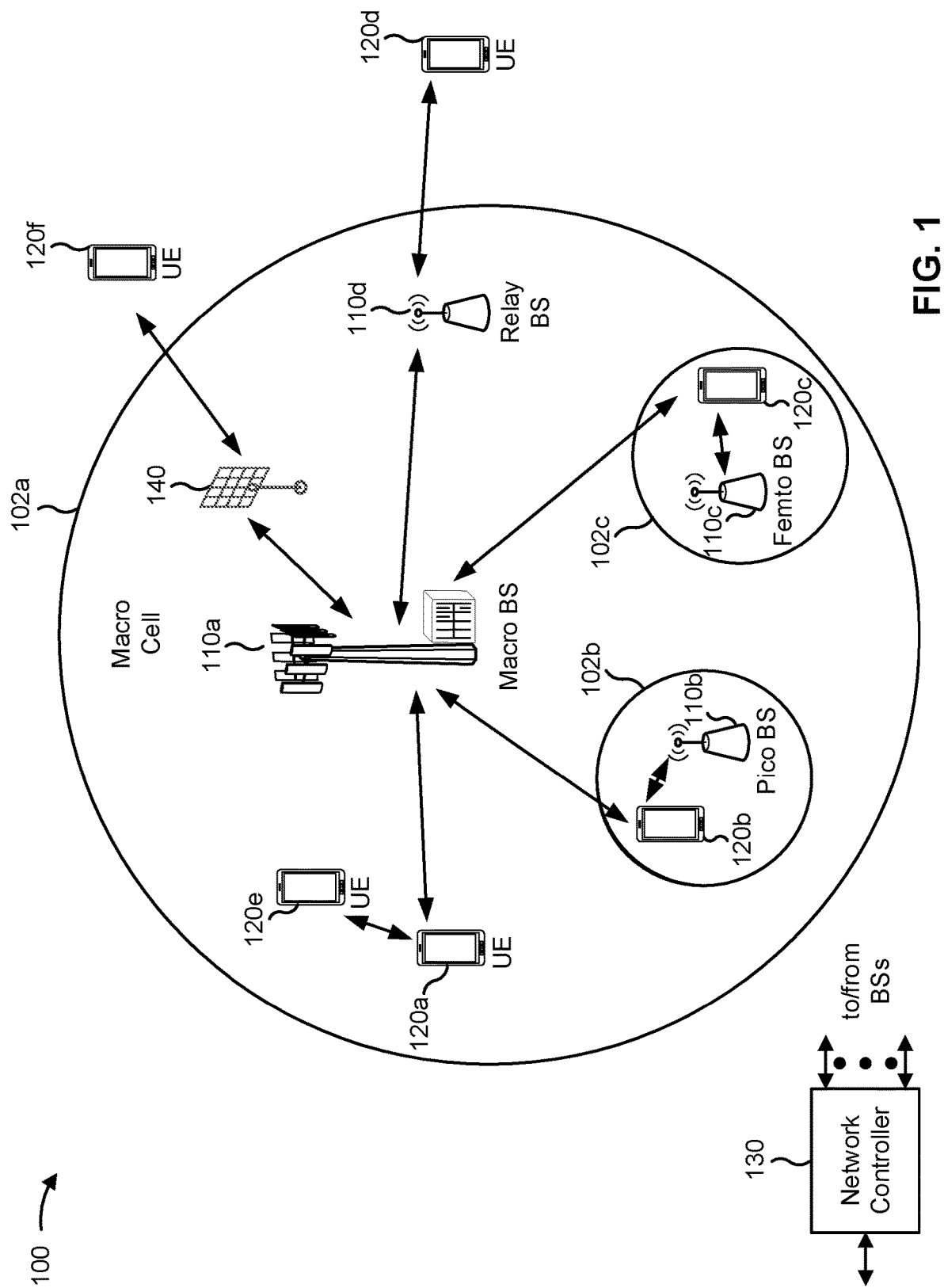
FIG. 1 is a diagram illustrating an example of a wireless communication network, in accordance with the present disclosure.

FIG. 1 is a diagram illustrating an example of a wireless network 100 in accordance which the present disclosure. The wireless network 100 may be or may include elements of a 5G (NR) network and/or an LTE network, among other examples. The wireless network 100 may include a number of base stations (BSs) 110 (shown as BS 110a, BS 110b, BS 110c, and BS 110d) and other network entities. ABS is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", "control node", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol, and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a repeater (or relay) 140 may receive a radio frequency (RF) analog signal (e.g., an analog millimeter wave signal) from a base station 110, may amplify the RF analog signal, and may transmit the amplified RF signal to one or more UEs 120 (e.g., shown as UE 120f). In some aspects, the repeater 140 may be an analog millimeter wave (mmWave) repeater that communicates on various mmWave frequencies, such as 3GPP FR2 frequencies, 3GPP Frequency Range 4 (FR4) frequencies, and/or other mmWave frequencies. The repeater 140 may receive, amplify, and transmit an RF analog signal without performing analog-to-digital conversion of the RF analog signal and/or without performing any digital signal processing on the RF analog signal. In this way, latency may be reduced and a cost to produce the repeater 140 may be reduced. Additional details regarding repeater 140 are provided elsewhere herein.

In some aspects, the repeater 140 may be layer 1 repeater. A layer 1 repeater may be a repeater that does not have a control interface with a base station 110 and a UE 120. In these cases, physical layer processing (e.g., layer 1 processing) of communications between the base station 110 and the UE 120 is handled by the repeater 140. However, higher layer control functions (e.g., layer 2 control functions, layer 3 control functions, and/or the like) are not handled by the layer 1 repeater and are coordinated between the base station 110 and the UE 120.

In some aspects, the repeater 140 may be a repeater configured with a control interface with a base station 110. In these cases, the base station 110 may function as a control node and send control commands to the repeater 140, as well as application layer messages from various core network devices (e.g., network controllers 130) in the wireless network 100, such as an operations, administration and maintenance (OAM) device and/or other devices. In some aspects, the base station 110 is capable of controlling and/or configuring beamforming for the repeater 140. For example, the base station 110 may transmit control commands to cause the repeater 140 to perform electrical (analog) beamforming, which may include phase shifting and/or scaling analog signals that are to be transmitted and/or received by the repeater 140. In some aspects, a UE 120 may function as a control node and send control commands to the repeater 140.

As indicated above, FIG. 1 is provided as an example. Other examples may differ from what is described with regard to FIG. 1.

Figure 2:
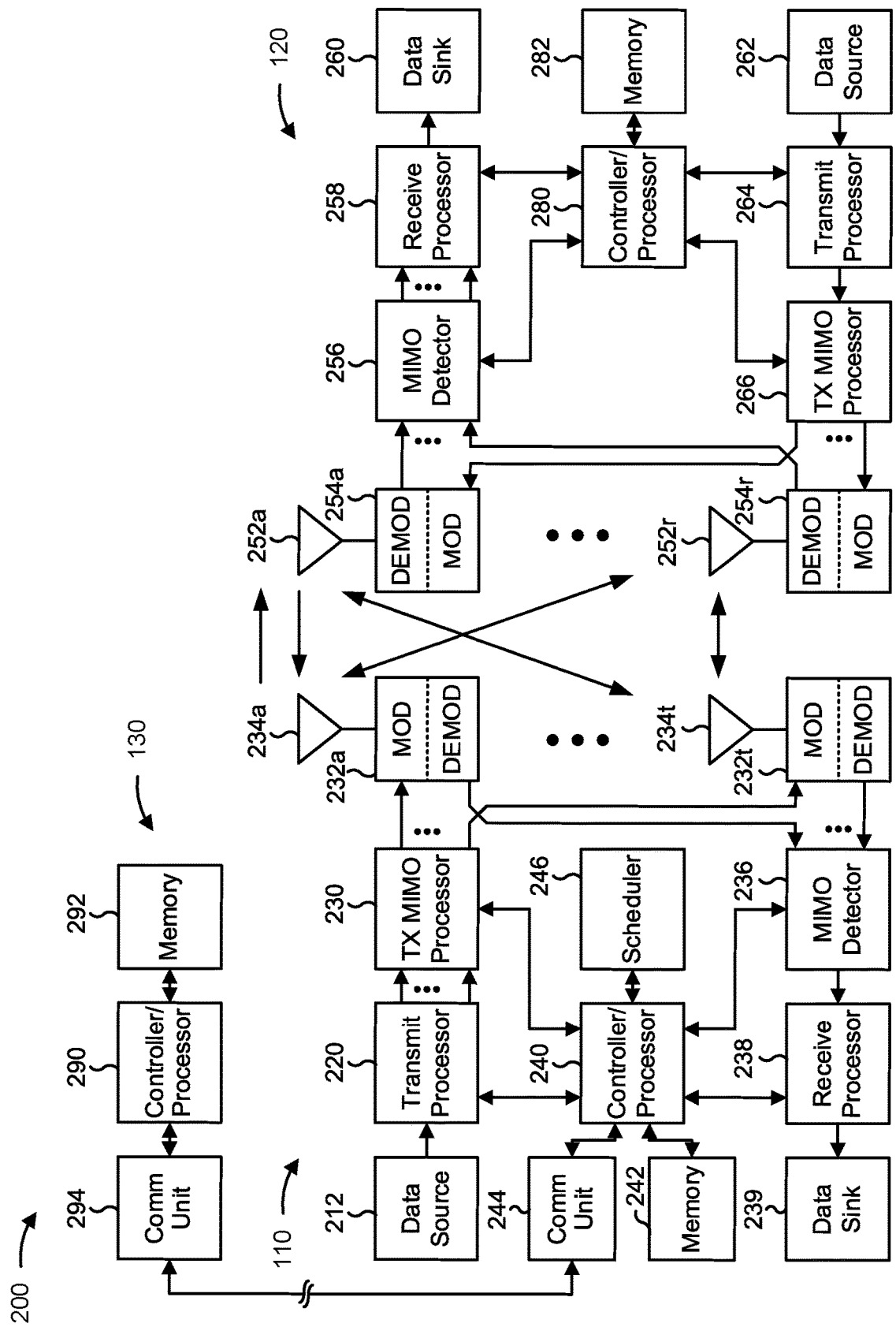
FIG. 2 is a diagram illustrating an example of a base station (BS) in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and/or synchronization signals (e.g., a primary synchronization signal (PSS) and/or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, a channel quality indicator (CQI) parameter, and/or another parameter. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294. In some aspects, a network controller 130 may function as a control node for a repeater 140 and may send control commands to the repeater 140, may control and/or configuring beamforming for the repeater 140, and/or may perform other control functions for the repeater 140. In some aspects, a network controller 130 may be implemented by a control entity such as a cloud platform or a cloud-based application that is hosted in a cloud environment.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with repeater mechanical beam steering, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. As such, memory 242 of the base station 110 can comprise a non-transitory computer-readable medium storing one or more instructions for wireless communication, where the one or more instructions comprise one or more instructions that, when executed by one or more processors (e.g., transmit processor 220, receive processor 238, and/or controller/processor 240) of the base station 110, cause the one or more processors to perform the method described in greater detail with reference to FIGS. 5A, 5B, 6, and/or 7. For example, the one or more instructions, when executed (e.g., directly, or after compiling, converting, interpreting, and/or the like)

by one or more processors of the base station 110 and/or the UE 120, may perform or direct operations of, for example, the operations illustrated and described below in process 600 of FIG. 6, process 700 of FIG. 7, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, base station 110 may include means for identifying one or more parameters for mechanical beam steering for a repeater 140 (e.g., using DEMOD 232, MIMO detector 236, receive processor 238, controller/processor 240, memory 242, transmit processor 220, TX MIMO processor 230, MOD 232, antenna 234, and/or the like), means for transmitting, to the repeater 140, an indication of the one or more parameters for mechanical beam steering (e.g., using controller/processor 240, memory 242, transmit processor 220, TX MIMO processor 230, MOD 232, antenna 234, and/or the like), and/or the like. In some aspects, such means may include one or more components of base station 110 described in connection with FIG. 2, such as DEMOD 232, MIMO detector 236, receive processor 238, controller/processor 240, memory 242, transmit processor 220, TX MIMO processor 230, MOD 232, antenna 234, and/or the like.

As indicated above, FIG. 2 is provided as an example. Other examples may differ from what is described with regard to FIG. 2.

Figure 3:
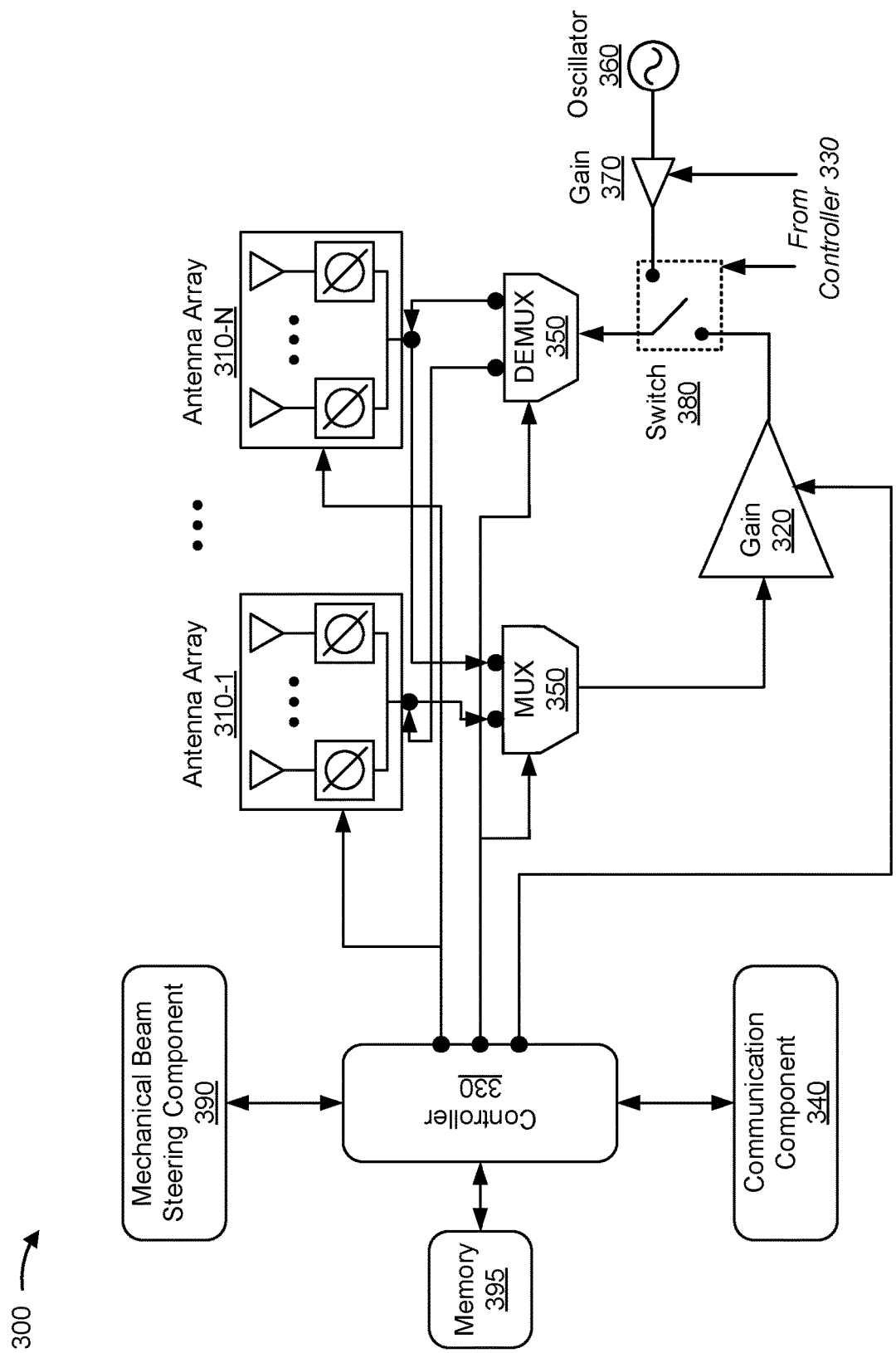
FIG. 3 is a diagram illustrating an example repeater, in accordance with the present disclosure.

FIG. 3 is a diagram illustrating an example of a repeater 300, in accordance with various aspects of the present disclosure. In some aspects, repeater 300 may correspond to repeater 140 shown in FIG. 1. In some aspects, repeater 300 may be an mmWave repeater that communicates via mmWave transmissions. In some aspects, repeater 300 is capable of communicating with a base station (e.g., a BS 110) and/or a UE (e.g., a UE 120) in a wireless network (e.g., wireless network 100).

As shown in FIG. 3, repeater 300 may include one or more antenna arrays (or antennas, antenna panels, and/or the like) 310-1 through 310-N (N>1), a gain component 320 (e.g., for amplifying RF signals received by repeater 300), a controller 330, a multiplexer (MUX) and/or demultiplexer (DEMUX) (MUX/DEMUX) 350, an oscillator 360 (e.g., for generating RF signals), a gain component 370 (e.g., for amplifying RF signals generated by repeater 300), a switch 380, and/or a mechanical beam steering component 390. In some aspects, repeater 300 includes a communication component 340 that is used to communicate with a BS 110 via a control interface. In some aspects, repeater 300 is not equipped with a communication component 340 and operates passively and/or autonomously without control from a BS 110.

An antenna array 310 may include multiple antenna elements capable of being configured for beamforming. For example, an antenna array 310 may be referred to as a phased array because phase values and/or phase offsets of the antenna elements may be configured to perform electrical or analog beamforming of a beam by forming the beam based at least in part on different electrical beamforming parameters such as phase values and/or phase offsets for different beams (e.g., in different directions). In some aspects, an antenna array 310 may be a fixed receive (Rx) antenna array capable of only receiving communications while not transmitting communications. In some aspects, an antenna array 310 may be a fixed transmit (Tx) antenna array capable of only transmitting communications while not receiving communications. In some aspects, an antenna array 310 may be configured to act as an Rx antenna array or a Tx antenna array (e.g., via a Tx/Rx switch, a MUX/DEMUX, and/or the like). An antenna array 310 may be capable of communicating using mmWaves and/or other types of RF analog signals.

Gain component 320 includes one or more components capable of amplifying an input signal and outputting an amplified signal. For example, gain component 320 may include a power amplifier, a variable gain component, and/or the like. In some aspects, gain component 320 may have variable gain control. Gain component 320 may connect to an Rx antenna array (e.g., a first antenna array 310-1) and a Tx antenna array (e.g., a second antenna array 310-2) such that an RF analog signal, received via the Rx antenna array, can be amplified by gain component 320 and output to the Tx antenna array for transmission. In some aspects, the level of amplification of gain component 320 may be controlled by the controller 330.

Controller 330 includes one or more components capable of controlling one or more other components of repeater 300. For example, controller 330 may include a controller, a microcontroller, a processor, and/or the like. In some aspects, controller 330 may control gain component 320 by controlling a level of amplification or gain applied by gain component 320 to an input signal. Additionally, or alternatively, controller 330 may control an antenna array 310 by controlling a beamforming configuration for the antenna array 310 (e.g., one or more phase values for the antenna array 310, one or more phase offsets for the antenna array 310, one or more power parameters for the antenna array 310, one or more beamforming parameters for the antenna array 310, a Tx beamforming configuration, an Rx beamforming configuration, and/or the like), by controlling whether the antenna array 310 acts as an Rx antenna array or a Tx antenna array (e.g., by configuring interaction and/or connections between the antenna array 310 and a MUX/DEMUX 350), and/or the like. Additionally, or alternatively, controller 330 may power on or power off one or more components of repeater 300 (e.g., when a BS 110 does not need to use the repeater to serve UEs 120). In some aspects, controller 330 may control a timing of one or more of the above configurations.

Additionally, or alternatively, controller 330 may control a position of a switch 380, included in repeater 300, in order to cause an oscillator 360, included in repeater 300, to be connected to one or more antennas 310 (e.g., via another gain component 370 included in repeater 300) in association with transmitting an RF analog signal. In some aspects, controller 330 may control gain component 370 by controlling a level of amplification or gain applied by gain component 370 to a signal provided by oscillator 360.

In cases where repeater 300 includes a communication component 340, communication component 340 may include a component capable of wirelessly communicating with a BS 110 via a control interface. In some aspects, communication component 340 may communicate with the BS 110 using one or more in-band radio frequencies (e.g., radio frequencies that are included within an operating frequency bandwidth of antenna arrays 310-1 through 310-N). In this case, the BS 110 may configure a bandwidth part (BWP) within the operating frequency bandwidth of antenna arrays 310-1 through 310-N (e.g., an in-band BWP) such that the BWP carries the control interface associated with repeater 300. In some aspects, an antenna array 310 may be used to wirelessly forward (e.g., transmit and/or receive) RF analog signals between repeater 300 and the BS 110, between repeater 300 and one or more UEs 120, and/or the like, and communication component 340 may be used to transfer control information between repeater 300 and the BS 110.

In some aspects, communication component 340 may include one or more components for digital signal processing (e.g., digital signal processor, a baseband processor, a digital-to-analog converter (DAC), an analog-to-digital converter (ADC), and/or the like). In this way, communication component 340 may demodulate, decode, and/or perform other types of processing on the control information received from a BS 110.

MUX/DEMUX 350 may be used to multiplex and/or demultiplex communications received from and/or transmitted to an antenna array 310. For example, MUX/DEMUX 350 may be used to switch an Rx antenna array to a Tx antenna array.

Oscillator 360 may be used to generate an RF analog signal for transmission by repeater 300 via an antenna array 310. Gain component 370 includes one or more components capable of amplifying an input signal and outputting an amplified signal (e.g., an amplified RF analog signal). For example, gain component 370 may include a power amplifier, a variable gain component, and/or the like. In some aspects, gain component 370 may have variable gain control. The gain component 370 may connect to oscillator 360 and a Tx antenna array (e.g., an antenna array 310) such that an RF analog signal, provided by oscillator 360, can be amplified by gain component 370 and output to the Tx antenna array for transmission. In some aspects, the level of amplification of gain component 370 may be controlled by controller 330.

Switch 380 includes one or more components capable of enabling repeater 300 to operate either to relay a signal received via an Rx antenna array (e.g., an antenna array 310) or to transmit an RF analog signal generated by repeater 300 (e.g., an RF analog signal generated by oscillator 360 and amplified by gain component 370). In some aspects, the position of switch 380 may be controlled by the controller 330.

Mechanical beam steering component 390 includes one or more component capable of adjusting horizontal rotation of antenna array 310 and/or repeater 300 to adjust an azimuth position (or horizontal rotational position) of antenna array 310 and/or repeater 300, adjusting vertical rotation of antenna array 310 and/or repeater 300 to adjust an elevation angle (or vertical rotational position) of antenna array 310 and/or repeater 300, and/or adjusting other mechanical or positional parameters of antenna array 310 and/or repeater 300. In some aspects, mechanical beam steering component 390 includes a servomotor or another type of actuator on which antenna array 310 and/or repeater 300 is positioned or installed such that rotation of the servomotor causes rotation (e.g., horizontal rotation, vertical rotation, and/or the like) of antenna array 310 and/or repeater 300.

Memory 395 may comprise a non-transitory computer-readable medium storing one or more instructions for wireless communication. For example, the one or more instructions, when executed (e.g., directly, or after compiling, converting, interpreting, and/or the like) by controller 330, may perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, repeater 300 may include means for identifying one or more parameters for mechanical beam steering (e.g., using antenna array 310, gain component 320, controller 330, communication component 340, MUX/DEMUX 350, oscillator 360, gain component 370, switch 380, mechanical beam steering component 390, memory 395, and/or the like), means for performing mechanical beam steering based at least in part on the one or more parameters (e.g., using antenna array 310, gain component 320, controller 330, communication component 340, MUX/DEMUX 350, oscillator 360, gain component 370, switch 380, mechanical beam steering component 390, memory 395, and/or the like), and/or the like. In some aspects, such means may include one or more components of repeater 300 described in connection with FIG. 3. In some aspects, such means may include one or more of antenna array 310, gain component 320, controller 330, communication component 340, MUX/DEMUX 350, oscillator 360, gain component 370, switch 380, mechanical beam steering component 390, memory 395, and/or the like.

As indicated above, FIG. 3 is provided as an example. Other examples may differ from what is described with regard to FIG. 3. For example, repeater 300 may include additional components, fewer components, different components, or differently arranged components than those shown in FIG. 3. Furthermore, two or more components shown in FIG. 3 may be implemented within a single component, or a single component shown in FIG. 3 may be implemented as multiple components. Additionally, or alternatively, a set of components (e.g., one or more components) of repeater 300 may perform one or more functions described as being performed by another set of components of repeater 300.

Figure 4A:
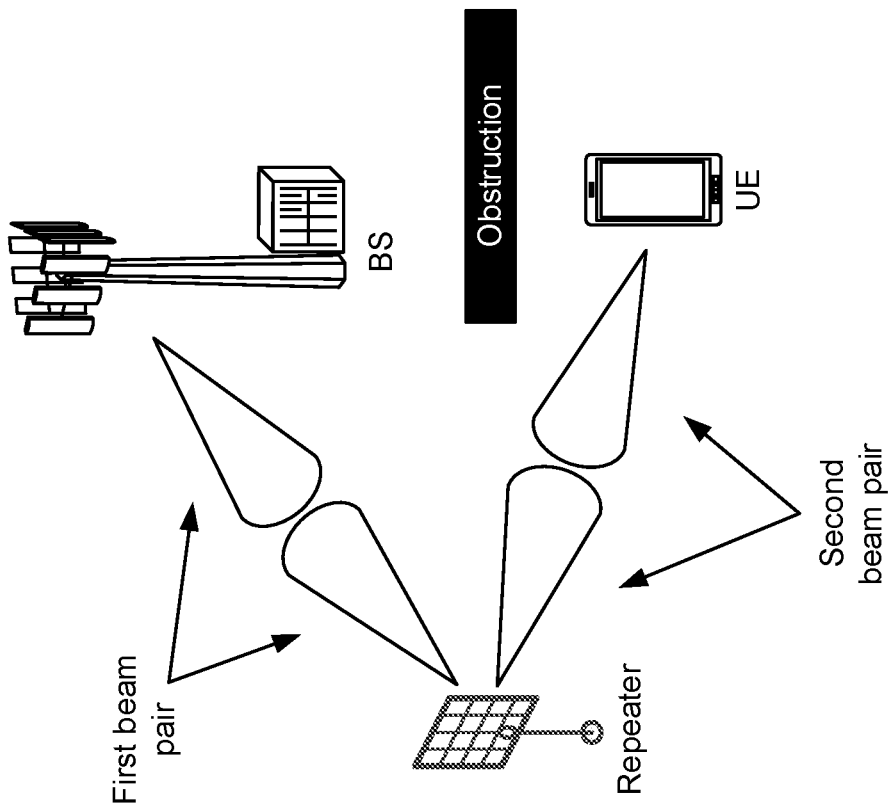
FIGS. 4A-4C are diagrams illustrating examples of communication using a repeater, in accordance with the present disclosure.
Figure 4B:
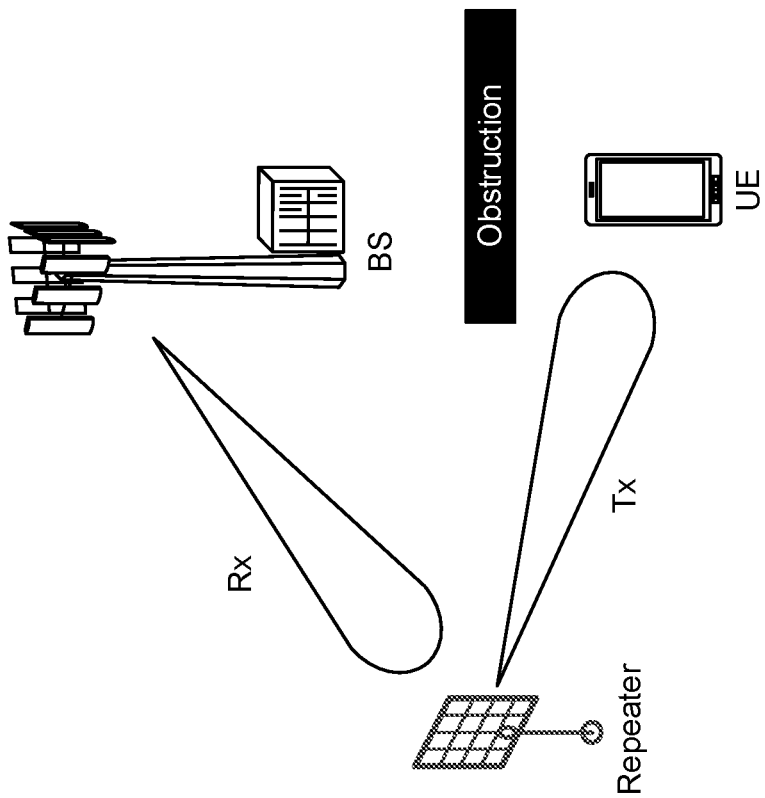
Figure 4C:
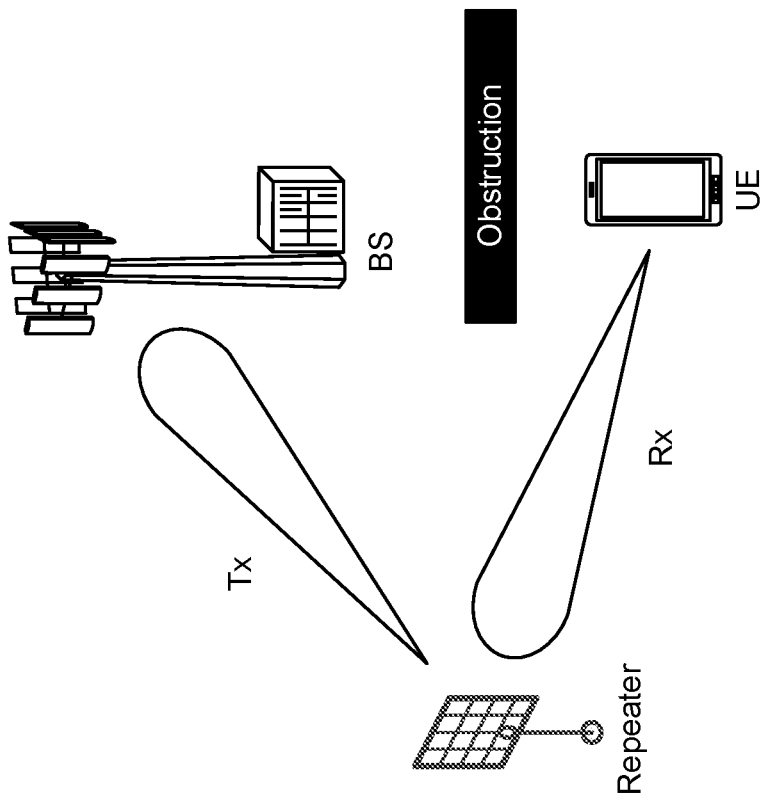

FIGS. 4A-4C are diagrams illustrating examples 400 of communication using a repeater, in accordance with various aspects of the present disclosure.

Because mmWave communications have a higher frequency and shorter wavelength than other types of radio waves used for communications (e.g., sub-6 GHz communications), mmWave communications may have shorter propagation distances and may be more easily blocked by obstructions than other types of radio waves. For example, a wireless communication that transmitted using sub-6 GHz radio waves may be capable of penetrating a wall of a building or a structure to provide coverage to an area on an opposite side of the wall from a BS 110 that communicates using the sub-6 GHz radio waves. However, an mmWave may not be capable of penetrating the same wall (e.g., depending on a thickness of the wall, a material from which the wall is constructed, and/or the like). Some techniques and apparatuses described herein use a repeater 140 to increase the coverage area of a BS 110 (e.g., a BS 110 that communicates using mmWave communications and/or other types of communications), to extend coverage to UEs 120 without line of sight to the BS 110 (e.g., due to an obstruction), and/or the like.

For example, as illustrated in the example of FIG. 4A, an obstruction between a UE and a BS blocks or otherwise reduces the quality of a link between the BS and the UE. However, no obstructions or fewer obstructions exist between a repeater and the UE and, as a result, it is possible that communications between the repeater and the UE will have a higher quality than communications directly between the BS the UE.

As further shown in FIG. 4A, the repeater may perform directional communication by using beamforming and/or mechanical beam steering to communicate with the BS via a first beam pair (e.g., a backhaul beam pair over a backhaul link) and to communicate with the UE via a second beam pair (e.g., an access beam pair over an access link). "Beam pair" may refer to a transmit (Tx) beam used by a first device for transmission and a receive (Rx) beam used by a second device for reception of information transmitted by the first device via the Tx beam.

As shown in FIG. 4B, the repeater may relay or forward downlink communications by transmitting RF analog signals received from the BS via an Rx beam of the first beam pair to the UE using a Tx beam of the second beam pair. In some aspects, the combination of the Rx beam of the first beam pair and the Tx beam of the second beam pair may be referred to as a downlink path.

As used herein, "relaying" or "forwarding" a received RF analog signal may refer to transmitting the received RF analog signal (e.g., after amplifying the received RF analog signal) without decoding the received RF analog signal and/or without modifying information carried in the received RF analog signal. Alternatively, relaying or forwarding a received RF analog signal may refer to transmitting the received RF analog signal after decoding the received signal and/or modifying information carried in the received RF analog signal. In some aspects, a received RF analog signal may be relayed or forwarded using a different time resource, a different frequency resource, and/or a different spatial resource (e.g., a different beam) to transmit the RF analog signal as compared to a time resource, a frequency resource, and/or a spatial resource in which the RF analog signal was received.

As shown in FIG. 4C, the repeater may relay or forward uplink communications by transmitting RF analog signals received from the UE via an Rx beam of the second beam pair to the BS using an Rx beam of the first beam pair. In some aspects, the combination of the Tx beam of the first beam pair and the Rx beam of the second beam pair may be referred to as an uplink path.

As indicated above, FIGS. 4A-4C are provided as examples. Other examples may differ from what is described with regard to FIGS. 4A-4C.

A repeater can provide a low-cost and easily deployable option to efficiently enhance wireless network performance by extending the coverage or range of BSs in the wireless network, by increasing the capacity (e.g., providing stronger end-to-end connections) of BSs in the wireless network, and/or the like. A repeater may be capable of providing the above-described wireless network performance enhancements and/or other enhancements in a variety of deployment scenarios, such as indoor deployments, outdoor deployments, indoor-to-outdoor coverage extensions and vice-versa, deployments to extend line-of-sight, and/or the like. To support many different types of deployments and changing conditions within a deployment, there may be difficulties and/or challenges in configuring a repeater to provide the above-described wireless network performance enhancements and/or other enhancements.

Some aspects described herein provide techniques and apparatuses for repeater mechanical beam steering. In some aspects, a repeater may be deployed in a wireless network and may be automatically configured using mechanical beam steering and electrical beamforming techniques to optimize the configuration of the repeater and to increase coverage and capacity of BSs in the wireless network. For example, a repeater may be configured with a mechanical beam steering component (e.g., mechanical beam steering component 390) that permits the repeater to adjust an azimuth position (or horizontal rotational position) of the repeater, to adjust an elevation angle (or vertical rotational position) of the repeater, and/or to adjust other mechanical parameters of the repeater to steer a transmit beam and/or a receive beam of the repeater in a particular direction.

In some aspects, if the repeater is configured with a communication component (e.g., communication component 340) that permits the repeater to communicate via a control interface with a BS, a UE, a network controller, and/or a core network device in the wireless network are permitted to transmit a mechanical beam steering configuration to the repeater. The mechanical beam steering configuration may include one or more parameters based at least in part on which the repeater may perform mechanical beam steering. Additionally and/or alternatively, the repeater may be capable of autonomously performing mechanical beam steering based at least in part on performing various measurements (e.g., wireless communication measurements, sensor measurements, and/or the like). In this way, the complexity, time, and cost of deploying repeaters in the wireless network is decreased.

Figure 5A:
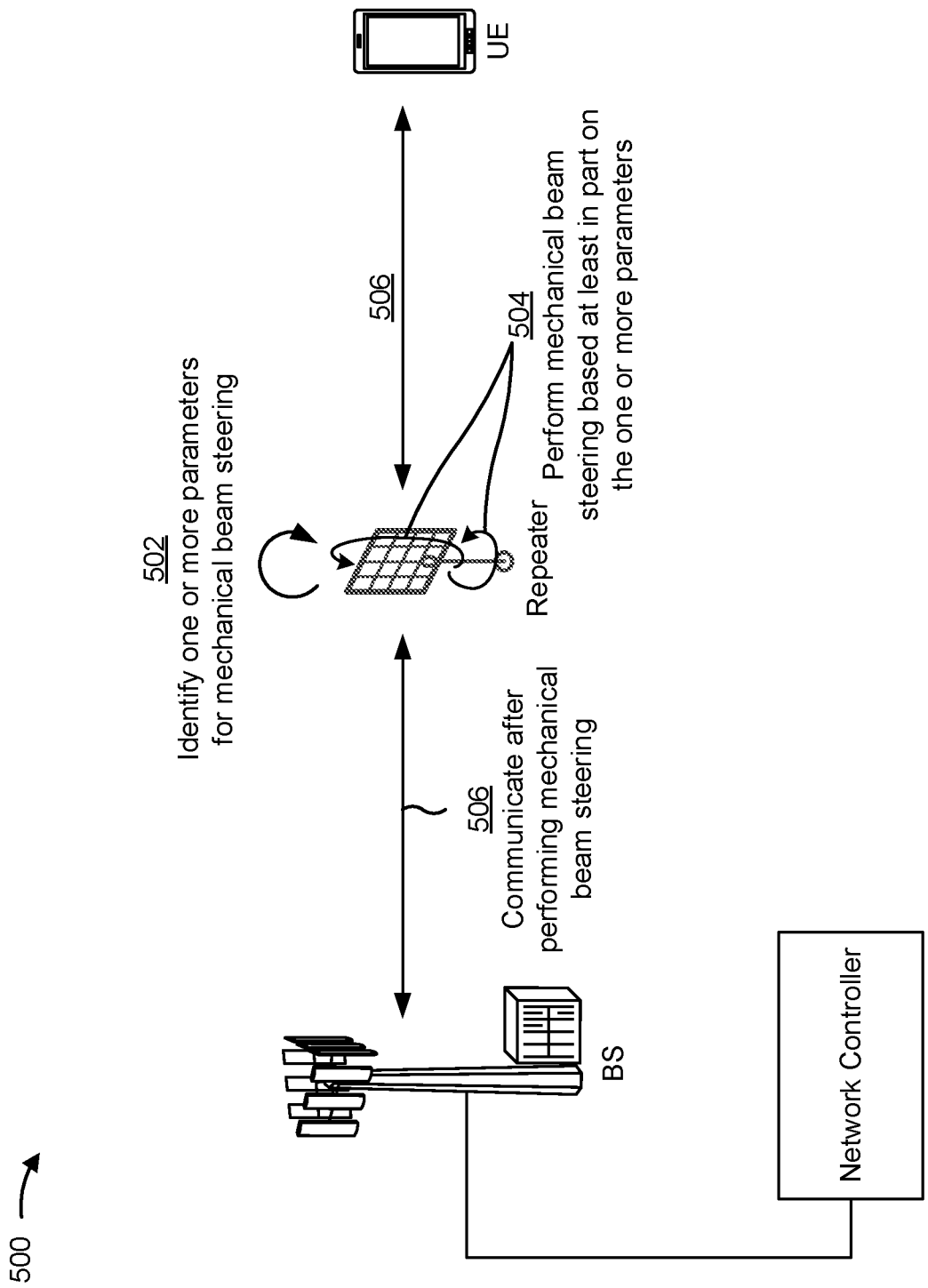
FIGS. 5A and 5B are diagrams illustrating one or more examples of repeater mechanical beam steering, in accordance with the present disclosure.
Figure 5B:
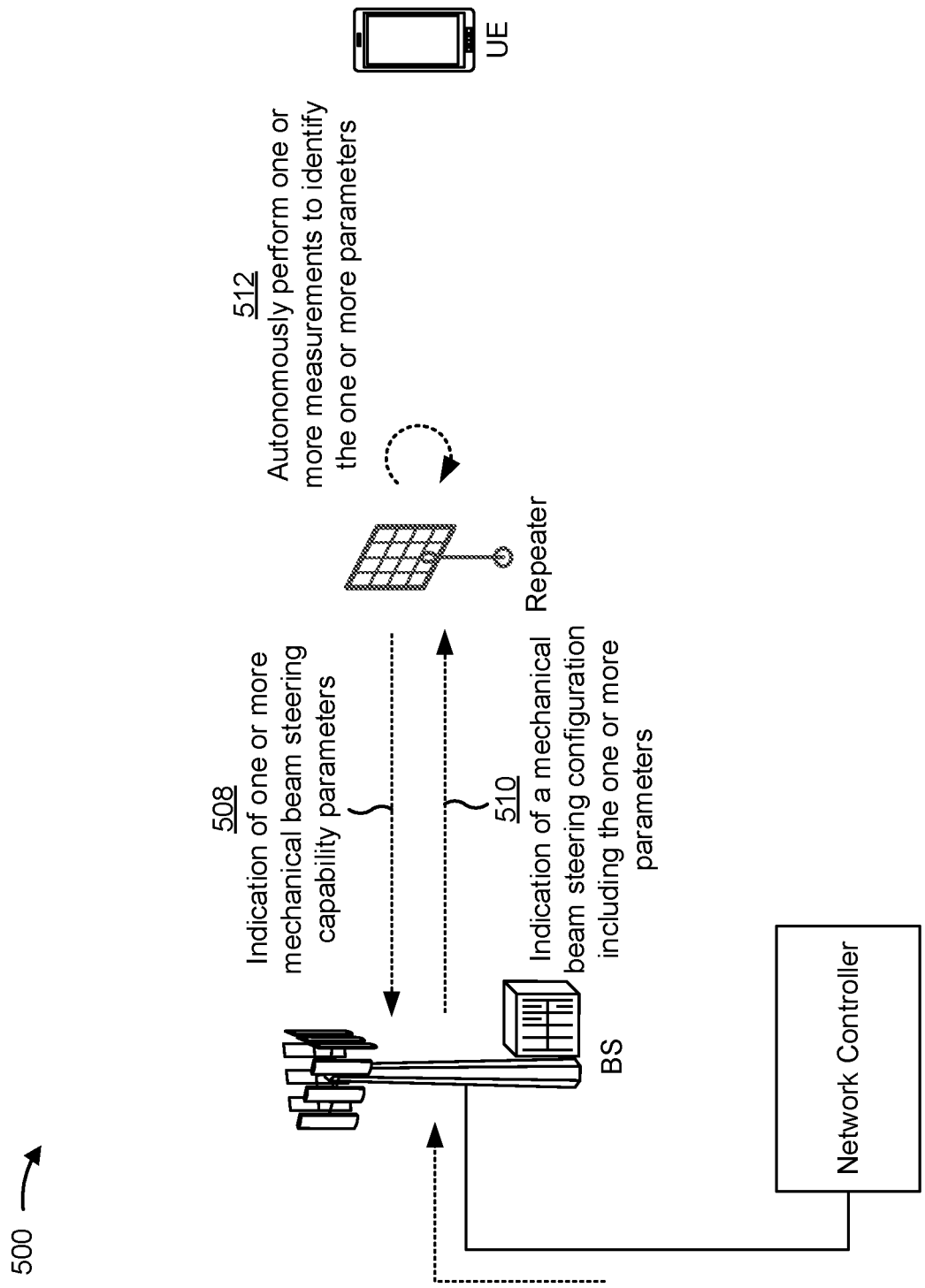

FIGS. 5A and 5B are diagrams illustrating an example 500 of repeater mechanical beam steering, in accordance with the present disclosure. As shown in FIGS. 5A and 5B, example(s) 500 include communication between one or more devices in a wireless network (e.g., wireless network 100), such as a network controller (e.g., network controller 130 illustrated and described above in connection with FIGS. 1 and 2), a BS (e.g., BS 110 illustrated and described above in connection with FIGS. 1 and 2, the BS illustrated and described above in connection with FIGS. 4A-4C), a repeater (e.g., repeater 140 illustrated and described above in connection with FIG. 1, repeater 300 illustrated and described above in connection with FIG. 3, the repeater illustrated and described above in connection with FIGS. 4A-4C, and/or the like), a UE (e.g., UE 120 illustrated and described above in connection with FIGS. 1 and 2), and/or the like. In some aspects, the BS, the repeater, and the UE communicate on one or more mmWave frequencies. In some aspects, the BS, the repeater, and the UE communicate on one or more sub-6 gigahertz (GHz) frequencies or 3GPP Frequency Range 1 (FR1) frequencies in addition to the one or more mmWave frequencies.

As shown in FIG. 5A, and by reference number 502, the repeater may identify one or more parameters for performing mechanical beam steering. The one or more parameters may include various mechanical adjustment parameters for the repeater, such as an azimuth position parameter, an elevation angle parameter, and/or other parameters. The azimuth position parameter may indicate an azimuth position setting for the repeater. For example, the azimuth position parameter may indicate the azimuth position setting as an explicit value in angular degrees or another explicit value, may indicate the azimuth position (or horizontal rotation position) setting as a relative value (e.g., a value of displacement from the current azimuth position of the repeater), and/or the like. The elevation angle parameter may indicate an elevation angle (or a vertical rotation position) setting for the repeater. For example, the elevation angle parameter may indicate the elevation angle setting as an explicit value in angular degrees or another explicit value, may indicate the elevation angle setting as a relative value (e.g., a value of displacement from the current elevation angle of the repeater), and/or the like.

As further shown in FIG. 5A, and by reference number 504, the repeater may perform mechanical beam steering based at least in part on the one or more parameters. For example, the repeater may adjust the azimuth position (or horizontal rotation position) of the repeater based at least in part on the azimuth position parameter, may adjust the azimuth position (or horizontal rotation position) of the repeater based at least in part on the azimuth position parameter, and/or the like. To adjust the azimuth position and/or the elevation angle position, a controller of the repeater (e.g., controller 330) may transmit a signal, an instruction, and/or the like to a mechanical beam steering component (e.g., mechanical beam steering component 390) of the repeater or associated with the repeater to cause the mechanical beam steering component to horizontally and/or vertically rotate the repeater (or one or more antenna arrays of the repeater).

As further shown in FIG. 5A, and by reference number 506, the repeater may communicate with the BS and/or the UE after performing mechanical beam steering based at least in part on the one or more parameters. For example, the repeater may receive an RF analog signal from the BS (e.g., on a mmWave frequency) and may relay or forward the RF analog signal to the UE (e.g., on a mmWave frequency). As another example, the repeater may receive a communication or signal from the UE (e.g., on a mmWave frequency) and may forward or transmit the communication or the signal to the BS (e.g., on a mmWave frequency).

In some aspects, the repeater performs electrical beamforming in addition to performing mechanical beam steering. In these cases, the repeater may perform electrical beamforming for a receive beam and/or a transmit beam of the repeater, and may receive and/or forward RF analog signals after performing electrical beamforming of the receive beam and/or the transmit beam. In some aspects, the repeater performs electrical beamforming for the receive beam and/or the transmit beam by adjusting one or more electrical beamforming parameters, which may include phase shifting and/or scaling the RF analog signals that are to be transmitted and/or received by the repeater, using the receive beam and/or the transmit beam.

As shown in FIG. 5B, in some aspects, the repeater identifies the one or more parameters for mechanical beam steering based at least in part on signaling received from the BS. As shown by reference number 508, the repeater may transmit an indication of one or more mechanical beam steering capability parameters to the BS. The BS may identify and configure the one or more parameters based at least in part on the one or more mechanical beam steering capability parameters. In some aspects, the BS transmits the indication of one or more mechanical beam steering capability parameters to the network controller, and the network controller identifies and configures the one or more parameters based at least in part on the one or more mechanical beam steering capability parameters.

The one or more mechanical beam steering capability parameters may include various mechanical adjustment capabilities of the repeater. For example, the one or more mechanical beam steering capability parameters may include an azimuth position range (or horizontal rotation range) of the repeater, an elevation angle range (or vertical rotation range) of the repeater, an azimuth position adjustment step size (or horizontal rotation adjustment step size), an elevation angle adjustment step size (or vertical rotation adjustment step size), a time duration for performing mechanical beam steering, and/or the like. The azimuth position range of the repeater may indicate a range in which the repeater is capable of adjusting the azimuth position of the repeater. The azimuth position range may be indicated in a range of angular degrees (e.g., 0° to 180°, 0° to 360°, −180° to 180° and/or the like) or in another unit of rotational measurement. The elevation angle range of the repeater may indicate a range in which the repeater is capable of adjusting the elevation angle of the repeater. The elevation angle range may be indicated in a range of angular degrees (e.g., 0° to 90°, −45° to 45° and/or the like) or in another unit of rotational measurement.

The azimuth position adjustment step size of the repeater may indicate an azimuth position (or horizontal rotation) adjustment granularity. For example, the azimuth position adjustment step size may indicate that the repeater is capable of adjusting the azimuth position (or horizontal rotation) in 1° increments, in 5°, or in other increment sizes. The elevation angle adjustment step size of the repeater may indicate an elevation angle (or vertical rotation) adjustment granularity. For example, the elevation angle adjustment step size may indicate that the repeater is capable of adjusting the elevation angle (or vertical rotation) in 3° increments, in 10°, or in other increment sizes.

The time duration for performing mechanical beam steering may indicate an amount of time (e.g., an average amount of time, a maximum amount of time, and/or the like) that the repeater takes to adjust the azimuth position (or horizontal rotation), the elevation angle (or vertical rotation), and/or other mechanical beam steering adjustments based at least in part on a set of parameters for mechanical beam steering. The time duration may be indicates in seconds, in milliseconds, and/or other time increments.

In some aspects, the BS and/or the network controller determines the one or more parameters for mechanical beam steering such that the one or more mechanical beam steering capability parameters of the repeater are satisfied. For example, the BS and/or the network control determines the azimuth position parameter based at least in part on the azimuth position range and/or the azimuth position adjustment step size of the repeater. As another example, the BS and/or the network control determines the elevation angle parameter based at least in part on the elevation angle range and/or the elevation angle adjustment step size of the repeater. As another example, if the one or more parameters for mechanical beam steering are associated with scheduling communications between the BS and the UE, the BS and/or the network controller determines the one or more parameters for mechanical beam steering such that the one or more parameters for mechanical beam steering are provided to the repeater in an amount of time, prior to the occurrence of the communications, that satisfies the time duration for performing mechanical beam steering. In this way, the timing for providing the one or more parameters for mechanical beam steering to the repeater provides the repeater with a sufficient amount of time to perform mechanical beam steering based at least in part on the one or more parameters.

As further shown in FIG. 5B, and by reference number 510, the repeater may receive an indication of a mechanical beam steering configuration from the BS. The mechanical beam steering configuration may include the one or more parameters for mechanical beam steering. The repeater may identify the one or more parameters based at least in part on receiving the indication. For example, the repeater may identify the one or more parameters indicated in the mechanical beam steering configuration.

In some aspects, the BS generates and/or configures the mechanical beam steering configuration and transmits the indication of the mechanical beam steering configuration to the repeater via a control interface with a BS. For example, the BS may transmit the indication of the mechanical beam steering configuration in a control command via the control interface. The control command may be included in a physical downlink control channel (PDCCH) communication or another type of downlink control communication. In some aspects, the network controller generates and/or configures the mechanical beam steering configuration and provides the mechanical beam steering configuration for transmission to the repeater. In these cases, the repeater may receive the indication of the mechanical beam steering configuration in an application layer message from the network controller via the BS.

As further shown in FIG. 5B, and by reference number 512, alternative and/or in addition to the techniques described above in connection with reference numbers 508 and 510, the repeater may perform one or more measurements to autonomously identify the one or more parameters for mechanical beam steering (e.g., without assistance from the BS and/or the network controller). The one or more measurements may include various types of measurements, such as radio measurements (e.g., RSRP measurements, RSRQ measurements, RSSI measurements, CQI measurements, pathloss measurements, latency measurements, and/or the like), one or more sensor measurements (e.g., radar measurements, orientation measurements, and/or the like), and/or the like. The repeater may perform the one or more measurements at various times and in various scenarios. For example, the repeater may perform the one or more measurements a part of an access procedure (e.g., a random access channel (RACH) procedure) with the BS. As another example, the repeater may perform the one or more measurements as a part of recovery procedure for a beam or link failure event. As another example, the repeater may perform the one or more measurements at the time of being deployed into the wireless network or at the time of initial integration into the wireless network.

The repeater may use various techniques to perform the one or more measurements. In some aspects, the repeater performs the one or more measurements for different mechanical beam steering settings of the repeater, for different electrical beamforming setting of the repeater, and/or the like. For example, the repeater may perform the one or more measurements for different mechanically adjusted azimuth positions (or horizontal rotational positions) of the repeater, for different mechanically adjusted elevation angles (or vertical rotational positions) of the repeater, and/or the like. As another example, the repeater may perform the one or more measurements for a plurality of different electrical beamforming parameters such as different electrically adjusted phase offsets (e.g., phase offsets for candidate transmit beams and/or candidate receive beams).

When performing the one or more measurements for different mechanically adjusted azimuth positions and/or for different mechanically adjusted elevation angles, the repeater may adjust the azimuth positions and/or the elevation angles in a particular pattern or sequence within the azimuth position range and/or the elevation angle range of the repeater. For example, the repeater may start at one end of the azimuth position range of the repeater (e.g., −180°) and perform the one or more measurements as the repeater adjusts the azimuth position to the opposite end of the azimuth position range (e.g., 180°). As another example, the repeater may start in the middle of the elevation angle range (e.g., 0°) and may perform the one or more measurements as the repeater adjusts the elevation angle to each end of the elevation angle range of the repeater (e.g., to −45° and then to 45°, or vice-versa). In some aspects, the repeater performs the one or more measurements for independent adjustments of the azimuth position and the elevation angle of the repeater. For example, the repeater may perform the one or more measurements while adjusting the azimuth position along the azimuth position range and without adjusting the elevation angle, and may perform the one or more measurements while adjusting the elevation angle along the elevation angle range and without adjusting the azimuth angle. In some aspects, the repeater performs the one or more measurements for different combinations of azimuth position and elevation angle adjustments.

In some aspects, the repeater may receive, from the BS (or a core network device included in a wireless network, or a network controller, or a UE, or a control entity such as a cloud platform), an indication of a mechanical beam steering configuration and an indication of an electrical beamforming configuration. The repeater may identify one or more mechanical beam steering parameters for communicating an RF analog signal in the mechanical beam steering configuration, and may identify one or more electrical beamforming parameters for communicating the RF analog signal in the electrical beamforming configuration.

In some aspects, the repeater may communicate a plurality of RF analog signals using a plurality of pairs of configurations, where each pair of configurations includes a mechanical beam steering configuration and an electrical beamforming configuration. The repeater may identify a pair of configurations (including a mechanical beam steering configuration and an electrical beamforming configuration), for communicating another RF analog signal, from the plurality of pairs of configurations. The repeater may identify the pair of configurations based at least in part on receiving an indication of the pair of configurations from the BS, based at least in part on performing one or more measurements of the plurality of RF analog signals, and/or based at least in part on other techniques and/or parameters.

In this way, the repeater may be deployed in the wireless network and may be automatically configured using mechanical beam steering and electrical beamforming techniques to optimize the configuration of the repeater and to increase coverage and capacity of the BS (and other BSs) in the wireless network.

As indicated above, FIGS. 5A and 5B is provided as one or more examples. Other examples may differ from what is described with respect to FIGS. 5A and 5B.

FIG. 6 is a diagram illustrating an example process 600 performed, for example, by a repeater, in accordance with the present disclosure. Example process 600 is an example where the repeater (e.g., repeater 140 illustrated and described above in connection with FIG. 1, repeater 300 illustrated and described above in connection with FIG. 3, the repeater illustrated and described above in connection with FIGS. 4A-4C, the repeater illustrated and described above in connection with FIGS. 5A and 5B, and/or the like) performs operations associated with repeater mechanical beam steering.

As shown in FIG. 6, in some aspects, process 600 may include identifying one or more parameters for mechanical beam steering (block 610). For example, the repeater (e.g., using antenna array 310, gain component 320, controller 330, communication component 340, MUX/DEMUX 350, oscillator 360, gain component 370, switch 380, mechanical beam steering component 390, memory 395, and/or the like)

may identify one or more parameters for mechanical beam steering, as described above in connection with FIGS. 5A and 5B.

As further shown in FIG. 6, in some aspects, process 600 may include performing mechanical beam steering based at least in part on the one or more parameters (block 620). For example, the repeater (e.g., using antenna array 310, gain component 320, controller 330, communication component 340, MUX/DEMUX 350, oscillator 360, gain component 370, switch 380, mechanical beam steering component 390, memory 395, and/or the like) may perform mechanical beam steering based at least in part on the one or more parameters, as described above in connection with FIGS. 5A and 5B.

Process 600 may include additional aspects, such as any single aspect or any combination of aspects described below and/or in connection with one or more other processes described elsewhere herein.

In a first aspect, process 600 comprises receiving, from a BS or a core network device in a wireless network, an indication of a mechanical beam steering configuration, and identifying the one or more parameters for mechanical beam steering comprises identifying the one or more parameters in the mechanical beam steering configuration. In a second aspect, alone or in combination with the first aspect, the repeater is communicatively connected with the BS via a control interface, and receiving the indication of a mechanical beam steering configuration comprises receiving the indication of a mechanical beam steering configuration in a control command via the control interface.

In a third aspect, alone or in combination with one or more of the first and second aspects, receiving the indication of a mechanical beam steering configuration comprises: receiving the indication of a mechanical beam steering configuration in an application layer message from the core network device. In a fourth aspect, alone or in combination with one or more of the first through third aspects, process 600 comprises transmitting, to a BS, an indication of one or more mechanical beam steering capability parameters of the repeater, wherein the one or more is parameters for mechanical beam steering are based at least in part on the one or more mechanical beam steering capability parameters of the repeater.

In a fifth aspect, alone or in combination with one or more of the first through fourth aspects, the one or more mechanical beam steering capability parameters of the repeater comprise at least one of a horizontal rotation range of the repeater, a vertical rotation range of the repeater, a horizontal rotation adjustment step size, a vertical rotation adjustment step size, or a time duration for performing mechanical beam steering based at least in part on the one or more parameters for mechanical beam steering. In a sixth aspect, alone or in combination with one or more of the first through fifth aspects, identifying the one or more parameters for mechanical beam steering comprises performing one or more measurements, and identifying the one or more parameters for mechanical beam steering based at least in part on results of the one or more measurements.

In a seventh aspect, alone or in combination with one or more of the first through sixth aspects, performing the one or more measurements comprises at least one of performing the one or more measurements for different mechanically adjusted azimuth positions of the repeater, performing the one or more measurements for different mechanically adjusted elevation angles of the repeater, performing the one or more measurements for different electrically adjusted azimuth positions of the repeater, performing the one or more measurements for different electrically adjusted phase offsets, or performing one or more sensor measurements. In an eighth aspect, alone or in combination with one or more of the first through seventh aspects, performing the one or more measurements comprises performing the one or more measurements for different mechanically adjusted azimuth positions of the repeater in a particular azimuth position adjustment pattern.

In a ninth aspect, alone or in combination with one or more of the first through eighth aspects, performing the one or more measurements comprises performing the one or more measurements for different mechanically adjusted elevation angles of the repeater in a particular elevation angle adjustment pattern. In a tenth aspect, alone or in combination with one or more of the first through ninth aspects, performing the one or more measurements comprises performing the one or more measurements as a part of an access procedure with a base station.

In an eleventh aspect, alone or in combination with one or more of the first through tenth aspects, performing the one or more measurements comprises performing the one or more measurements as a part of recovery procedure for a beam or link failure event. In a twelfth aspect, alone or in combination with one or more of the first through eleventh aspects, performing mechanical beam steering based at least in part on the one or more parameters comprises at least one of adjusting an azimuth position of the repeater based at least in part on the one or more parameters, or adjusting an elevation angle of the repeater based at least in part on the one or more parameters.

In a thirteenth aspect, alone or in combination with one or more of the first through twelfth aspects, process 600 comprises receiving, after performing mechanical beam steering based at least in part on the one or more parameters, an RF analog signal from a first wireless communication device; and forwarding the RF analog signal to a second wireless communication device. In a fourteenth aspect, alone or in combination with one or more of the first through thirteenth aspects, receiving the RF analog signal comprises receiving the RF analog signal on a millimeter wave frequency, and forwarding the RF analog signal comprises forwarding the RF analog signal on the millimeter wave frequency.

In a fifteenth aspect, alone or in combination with one or more of the first through fourteenth aspects, the first communication device is a BS, and the method further comprises receiving an indication of the one or more parameters for mechanical beam steering from the BS. In a sixteenth aspect, alone or in combination with one or more of the first through fifteenth aspects, the second communication device is a BS, and process 600 further comprises receiving an indication of the one or more parameters for mechanical beam steering from the BS.

In a seventeenth aspect, alone or in combination with one or more of the first through sixteenth aspects, at least one of receiving the RF analog signal comprises performing electrical beamforming for a receive beam of the repeater, and receiving the RF analog signal using the receive beam after performing electrical beamforming for the receive beam; or forwarding the RF analog signal comprises performing electrical beamforming for a transmit beam of the repeater; and forwarding the RF analog signal using the transmit beam after performing electrical beamforming for the transmit beam.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
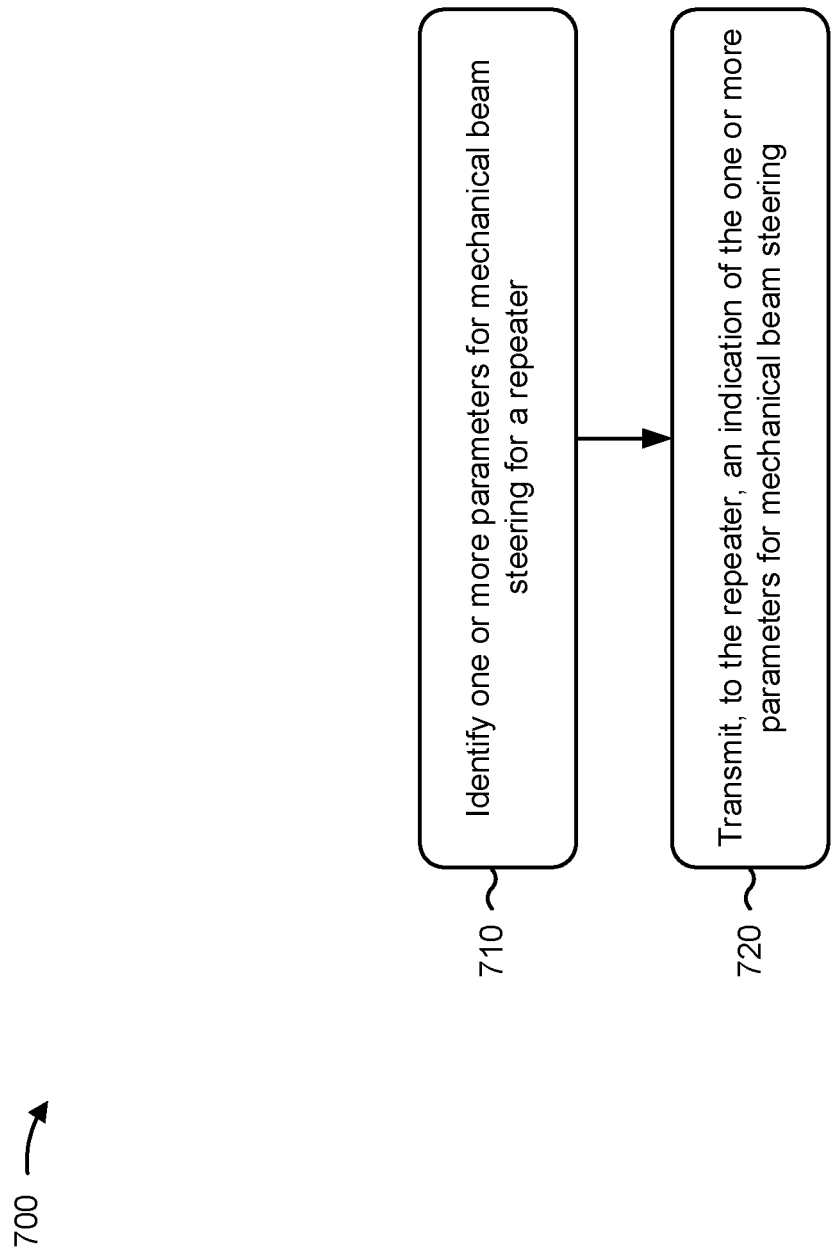
FIG. 7 is a diagram illustrating an example process performed, for example, by a BS, in accordance with present disclosure.

FIG. 7 is a diagram illustrating an example process 700 performed, for example, by a BS, in accordance with the present disclosure. Example process 700 is an example where the BS (e.g., BS 110 illustrated and described above in connection with one or more of FIGS. 1-3, the BS illustrated and described above in connection with FIGS. 4A-4C, the BS illustrated and described above in connection with FIGS. 5A and 5B, and/or the like) performs operations associated with repeater mechanical beam steering.

As shown in FIG. 7, in some aspects, process 700 may include identifying one or more parameters for mechanical beam steering for a repeater (block 710). For example, the BS (e.g., using DEMOD 232, MIMO detector 236, receive processor 238, controller/processor 240, memory 242, transmit processor 220, TX MIMO processor 230, MOD 232, antenna 234, and/or the like) may identify one or more parameters for mechanical beam steering for a repeater, as described above in connection with FIGS. 5A and 5B.

As further shown in FIG. 7, in some aspects, process 700 may include transmitting, to the repeater, an indication of the one or more parameters for mechanical beam steering (block 720). For example, the BS (e.g., using controller/processor 240, memory 242, transmit processor 220, TX MIMO processor 230, MOD 232, antenna 234, and/or the like) may transmit, to the repeater, an indication of the one or more parameters for mechanical beam steering, as described above in connection with FIGS. 5A and 5B.

Process 700 may include additional aspects, such as any single aspect or any combination of aspects described below and/or in connection with one or more other processes described elsewhere herein.

In a first aspect, transmitting the indication of the one or more parameters for mechanical beam steering comprises transmitting the indication of the one or more parameters for mechanical beam steering in a mechanical beam steering configuration. In a second aspect, alone or in combination with the first aspect, the BS is communicatively connected with the repeater via a control interface, and transmitting the indication of a mechanical beam steering configuration comprises transmitting the indication of a mechanical beam steering configuration in a control command via the control interface.

In a third aspect, alone or in combination with one or more of the first and second aspects, identifying the one or more parameters for mechanical beam steering comprises identifying the one or more parameters for mechanical beam steering based at least in part on the one or more mechanical beam steering capability parameters. In a fourth aspect, alone or in combination with one or more of the first through third aspects, the one or more mechanical beam steering capability parameters of the repeater comprise at least one of an azimuth position range of the repeater, an elevation angle range of the repeater, an azimuth position adjustment step size, an elevation angle adjustment step size, or a time duration for performing mechanical beam steering based at least in part on the one or more parameters for mechanical beam steering.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
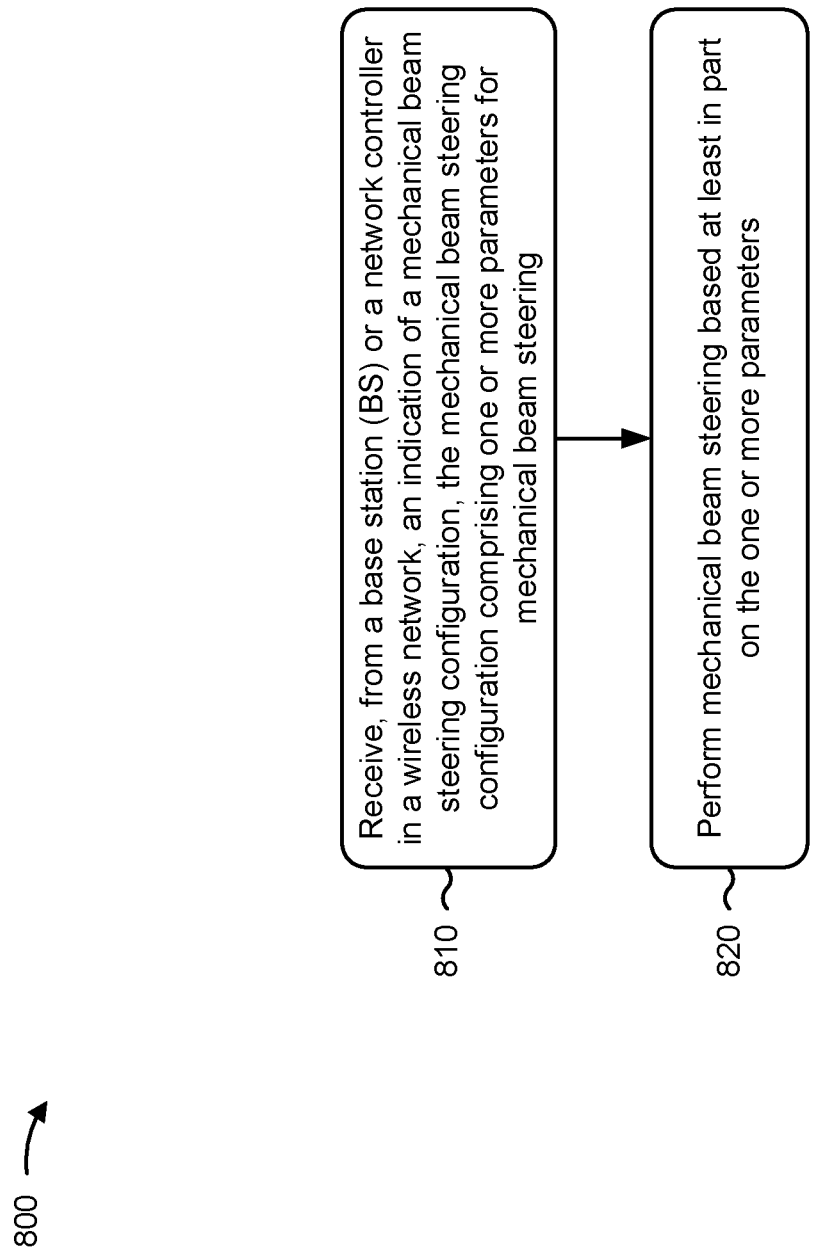

FIG. 8 is a diagram illustrating an example process 800 performed, for example, by a repeater, in accordance with the present disclosure. Example process 800 is an example where the repeater (e.g., repeater 140) performs operations associated with repeater mechanical beam steering.

As shown in FIG. 8, in some aspects, process 800 may include receiving, from a BS or a network controller in a wireless network, an indication of a mechanical beam steering configuration, the mechanical beam steering configuration comprising one or more parameters for mechanical beam steering (block 810). For example, the repeater (e.g., using antenna array 310, gain component 320, controller 330, communication component 340, MUX/DEMUX 350, oscillator 360, gain component 370, switch 380, mechanical beam steering component 390, and/or memory 395) may receive, from a BS or a network controller in a wireless network, an indication of a mechanical beam steering configuration, the mechanical beam steering configuration comprising one or more parameters for mechanical beam steering, as described above, for example, with reference to FIGS. 5A and 5B.

As further shown in FIG. 8, in some aspects, process 800 may include performing mechanical beam steering based at least in part on the one or more parameters (block 820). For example, the repeater (e.g., using antenna array 310, gain component 320, controller 330, communication component 340, MUX/DEMUX 350, oscillator 360, gain component 370, switch 380, mechanical beam steering component 390, and/or memory 395) may perform mechanical beam steering based at least in part on the one or more parameters, as described above, for example, with reference to FIGS. 5A and 5B.

Process 800 may include additional aspects, such as any single aspect or any combination of aspects described below and/or in connection with one or more other processes described elsewhere herein.

In a first aspect, the repeater is communicatively connected with the BS via a control interface, and wherein receiving the indication of a mechanical beam steering configuration comprises receiving the indication of a mechanical beam steering configuration in a control command via the control interface. In a second aspect, alone or in combination with the first aspect, receiving the indication of a mechanical beam steering configuration comprises receiving the indication of a mechanical beam steering configuration in an application layer message from the network controller.

In a third aspect, alone or in combination with one or more of the first and second aspects, process 800 includes transmitting, to a BS, an indication of one or more mechanical beam steering capability parameters of the repeater, wherein the one or more parameters for mechanical beam steering are based at least in part on the one or more mechanical beam steering capability parameters of the repeater. In a fourth aspect, alone or in combination with one or more of the first through third aspects, the one or more mechanical beam steering capability parameters of the repeater comprise at least one of a horizontal rotation range of the repeater, a vertical rotation range of the repeater, a horizontal rotation adjustment step size, a vertical rotation adjustment step size, or a time duration for performing mechanical beam steering based at least in part on the one or more parameters for mechanical beam steering.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a repeater, in accordance with the present disclosure. Example process 900 is an example where the repeater (e.g., repeater 140) performs operations associated with repeater mechanical beam steering.

As shown in FIG. 9, in some aspects, process 900 may include communicating a plurality of first RF analog signals based at least in part on a plurality of mechanical beam steering parameters and a plurality of electrical beamforming parameters (block 910). For example, the repeater (e.g., using antenna array 310, gain component 320, controller 330, communication component 340, MUX/DEMUX 350, oscillator 360, gain component 370, switch 380, mechanical beam steering component 390, and/or memory 395) may communicate a plurality of first RF analog signals based at least in part on a plurality of mechanical beam steering parameters and a plurality of electrical beamforming parameters, as described above, for example, with reference to FIGS. 5A and 5B.

As further shown in FIG. 9, in some aspects, process 900 may include performing, based at least in part on a first subset of the plurality of mechanical beam steering parameters, mechanical beam steering for at least one of a transmit beam of the repeater or a receive beam of the repeater (block 920). For example, the repeater (e.g., using antenna array 310, gain component 320, controller 330, communication component 340, MUX/DEMUX 350, oscillator 360, gain component 370, switch 380, mechanical beam steering component 390, and/or memory 395) may perform, based at least in part on a first subset of the plurality of mechanical beam steering parameters, mechanical beam steering for at least one of a transmit beam of the repeater or a receive beam of the repeater, as described above, for example, with reference to FIGS. 5A and 5B.

As further shown in FIG. 9, in some aspects, process 900 may include performing, based at least in part on a second subset of the plurality of electrical beamforming parameters, electrical beamforming for at least one of the transmit beam or the receive beam (block 930). For example, the repeater (e.g., using antenna array 310, gain component 320, controller 330, communication component 340, MUX/DEMUX 350, oscillator 360, gain component 370, switch 380, mechanical beam steering component 390, and/or memory 395) may perform, based at least in part on a second subset of the plurality of electrical beamforming parameters, electrical beamforming for at least one of the transmit beam or the receive beam, as described above, for example, with reference to FIGS. 5A and 5B.

As further shown in FIG. 9, in some aspects, process 900 may include communicating a second RF analog signal using at least one of the transmit beam or the receive beam after performing the mechanical beam steering and the electrical beamforming (block 940). For example, the repeater (e.g., using antenna array 310, gain component 320, controller 330, communication component 340, MUX/DEMUX 350, oscillator 360, gain component 370, switch 380, mechanical beam steering component 390, and/or memory 395) may communicate a second RF analog signal using at least one of the transmit beam or the receive beam after performing the mechanical beam steering and the electrical beamforming, as described above, for example, with reference to FIGS. 5A and 5B.

Process 900 may include additional aspects, such as any single aspect or any combination of aspects described below and/or in connection with one or more other processes described elsewhere herein.

In a first aspect, process 900 includes receiving, from a BS or a core network device in a wireless network, an indication of a mechanical beam steering configuration, and identifying the first subset in the mechanical beam steering configuration. In a second aspect, alone or in combination with the first aspect, process 900 includes performing one or more measurements of the plurality of first RF analog signals, and identifying the first subset and the second subset based at least in part on results of the one or more measurements.

In a third aspect, alone or in combination with one or more of the first and second aspects, performing the one or more measurements comprises at least one of performing the one or more measurements for different mechanically adjusted azimuth positions of the repeater, performing the one or more measurements for different mechanically adjusted elevation angles of the repeater, performing the one or more measurements for different electrically adjusted phase offsets, or performing one or more sensor measurements. In a fourth aspect, alone or in combination with one or more of the first through third aspects, performing the one or more measurements comprises performing the one or more measurements for different mechanically adjusted azimuth positions of the repeater in a particular azimuth position adjustment pattern.

In a fifth aspect, alone or in combination with one or more of the first through fourth aspects, performing the one or more measurements comprises performing the one or more measurements for different mechanically adjusted elevation angles of the repeater in a particular elevation angle adjustment pattern. In a sixth aspect, alone or in combination with one or more of the first through fifth aspects, performing the one or more measurements comprises performing the one or more measurements as a part of an access procedure with a base station.

In a seventh aspect, alone or in combination with one or more of the first through sixth aspects, performing the one or more measurements comprises performing the one or more measurements as a part of recovery procedure for a beam or link failure event. In an eighth aspect, alone or in combination with one or more of the first through seventh aspects, performing the mechanical beam steering based at least in part on the first subset comprises at least one of adjusting an azimuth position of the repeater based at least in part on the first subset, or adjusting an elevation angle of the repeater based at least in part on the first subset.

In a ninth aspect, alone or in combination with one or more of the first through eighth aspects, communicating the second RF analog signal comprises receiving, after performing the mechanical beam steering based at least in part on the first subset, a second RF analog signal from a first wireless communication device, and forwarding the second RF analog signal to a second wireless communication device. In a tenth aspect, alone or in combination with one or more of the first through ninth aspects, receiving the second RF analog signal comprises receiving the second RF analog signal on a millimeter wave frequency, and forwarding the second RF analog signal comprises forwarding the second RF analog signal on the millimeter wave frequency.

In an eleventh aspect, alone or in combination with one or more of the first through tenth aspects, at least one of receiving the second RF analog signal comprises receiving the second RF analog signal using the receive beam after performing the electrical beamforming based at least in part on the second subset, or forwarding the second RF analog signal comprises forwarding the second RF analog signal using the transmit beam after performing the electrical beamforming based at least in part on the second subset.

In a twelfth aspect, alone or in combination with one or more of the first through eleventh aspects, process 900 includes receiving, from a BS or a core network device in a wireless network, an indication of a mechanical beam steering configuration and an indication of an electrical beamforming configuration, identifying the first subset in the mechanical beam steering configuration, and identifying the second subset in the electrical beamforming configuration. In a thirteenth aspect, alone or in combination with one or more of the first through twelfth aspects, the plurality of mechanical beam steering parameters are included in a plurality of mechanical beam steering configurations, the plurality of electrical beamforming parameters are included in a plurality of electrical beamforming configurations, communicating a plurality of first RF analog signals comprises communicating the plurality of first RF analog signals using a plurality of pairs of mechanical beam steering configurations and electrical beam steering configurations, wherein the plurality of pairs include the plurality of mechanical beam steering configurations and the plurality of electrical beamforming configurations, and process 900 includes identifying a pair of a mechanical beam steering configuration and an electrical beamforming configuration from the plurality of pairs, wherein the mechanical beam steering configuration includes the first subset, and wherein the electrical beamforming configuration includes the second subset.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a repeater, comprising: receiving, from a base station (BS) or a network controller in a wireless network, an indication of a mechanical beam steering configuration, the mechanical beam steering configuration comprising one or more parameters for mechanical beam steering; and performing mechanical beam steering based at least in part on the one or more parameters.

Aspect 2: The method of Aspect 1, wherein the repeater is communicatively connected with the BS via a control interface; and wherein receiving the indication of a mechanical beam steering configuration comprises: receiving the indication of a mechanical beam steering configuration in a control command via the control interface. Aspect 3: The method of Aspect 1 or 2, wherein receiving the indication of a mechanical beam steering configuration comprises: receiving the indication of a mechanical beam steering configuration in an application layer message from the network controller.

Aspect 4: The method of any of Aspects 1-3, further comprising: transmitting, to the BS, an indication of one or more mechanical beam steering capability parameters of the repeater, wherein the one or more parameters for mechanical beam steering are based at least in part on the one or more mechanical beam steering capability parameters of the repeater. Aspect 5: The method of Aspect 4, wherein the one or more mechanical beam steering capability parameters of the repeater comprise at least one of: a horizontal rotation range of the repeater, a vertical rotation range of the repeater, a horizontal rotation adjustment step size, a vertical rotation adjustment step size, or a time duration for performing mechanical beam steering based at least in part on the one or more parameters for mechanical beam steering.

Aspect 6: A method of wireless communication performed by a repeater, comprising: communicating a plurality of first radio frequency (RF) analog signals based at least in part on a plurality of mechanical beam steering parameters and a plurality of electrical beamforming parameters; performing, based at least in part on a first subset of the plurality of mechanical beam steering parameters, mechanical beam steering for at least one of a transmit beam of the repeater or a receive beam of the repeater; performing, based at least in part on a second subset of the plurality of electrical beamforming parameters, electrical beamforming for at least one of the transmit beam or the receive beam; and communicating a second RF analog signal using at least one of the transmit beam or the receive beam after performing the mechanical beam steering and the electrical beamforming.

Aspect 7: The method of Aspect 6, wherein the method further comprises: receiving, from a base station (BS) or a core network device in a wireless network, an indication of a mechanical beam steering configuration; and identifying the first subset in the mechanical beam steering configuration. Aspect 8: The method of Aspect 6 or 7, further comprising: performing one or more measurements of the plurality of first RF analog signals; and identifying the first subset and the second subset based at least in part on results of the one or more measurements.

Aspect 9: The method of Aspect 8, wherein performing the one or more measurements comprises at least one of: performing the one or more measurements for different mechanically adjusted azimuth positions of the repeater, performing the one or more measurements for different mechanically adjusted elevation angles of the repeater, performing the one or more measurements for different electrically adjusted phase offsets, or performing one or more sensor measurements. Aspect 10: The method of Aspect 8 or 9, wherein performing the one or more measurements comprises: performing the one or more measurements for different mechanically adjusted azimuth positions of the repeater in a particular azimuth position adjustment pattern.

Aspect 11: The method of any of Aspects 8-10, wherein performing the one or more measurements comprises: performing the one or more measurements for different mechanically adjusted elevation angles of the repeater in a particular elevation angle adjustment pattern. Aspect 12: The method of any of Aspects 8-11, wherein performing the one or more measurements comprises: performing the one or more measurements as a part of an access procedure with a base station.

Aspect 13: The method of any of Aspects 8-12, wherein performing the one or more measurements comprises: performing the one or more measurements as a part of recovery procedure for a beam or link failure event. Aspect 14: The method of any of Aspects 6-13, wherein performing the mechanical beam steering based at least in part on the first subset comprises at least one of: adjusting an azimuth position of the repeater based at least in part on the first subset, or adjusting an elevation angle of the repeater based at least in part on the first subset.

Aspect 15: The method of any of Aspects 8-14, further comprising: receiving, from a base station (BS) or a core network device in a wireless network, an indication of a mechanical beam steering configuration and an indication of an electrical beamforming configuration; identifying the first subset in the mechanical beam steering configuration; and identifying the second subset in the electrical beamforming configuration. Aspect 16: The method of any of Aspects 8-15, wherein the plurality of mechanical beam steering parameters are included in a plurality of mechanical beam steering configurations; wherein the plurality of electrical beamforming parameters are included in a plurality of electrical beamforming configurations; wherein communicating a plurality of first RF analog signals comprises communicating the plurality of first RF analog signals using a plurality of pairs of mechanical beam steering configurations and electrical beam steering configurations, wherein the plurality of pairs include the plurality of mechanical beam steering configurations and the plurality of electrical beamforming configurations; wherein the method further comprises: identifying a pair of a mechanical beam steering configuration and an electrical beamforming configuration from the plurality of pairs, wherein the mechanical beam steering configuration includes the first subset, and wherein the electrical beamforming configuration includes the second subset.

Aspect 17: The method of Aspect 15 or 16, wherein at least one of: receiving the second RF analog signal comprises: receiving the second RF analog signal using the receive beam after performing the electrical beamforming based at least in part on the second subset; or forwarding the second RF analog signal comprises: forwarding the second RF analog signal using the transmit beam after performing the electrical beamforming based at least in part on the second subset.

Aspect 18: A method of wireless communication performed by a repeater, comprising: identifying one or more parameters for mechanical beam steering; and performing mechanical beam steering based at least in part on the one or more parameters.

Aspect 19: The method of Aspect 18, wherein the method further comprises: receiving, from a base station (BS) or a core network device in a wireless network, an indication of a mechanical beam steering configuration; and wherein identifying the one or more parameters for mechanical beam steering comprises: identifying the one or more parameters in the mechanical beam steering configuration. Aspect 20: The method of Aspect 19, wherein the repeater is communicatively connected with the BS via a control interface; and wherein receiving the indication of a mechanical beam steering configuration comprises: receiving the indication of a mechanical beam steering configuration in a control command via the control interface.

Aspect 21: The method of Aspect 19 or 20, wherein receiving the indication of a mechanical beam steering configuration comprises: receiving the indication of a mechanical beam steering configuration in an application layer message from the core network device. Aspect 22: The method of any of Aspects 18-21, further comprising: transmitting, to a base station, an indication of one or more mechanical beam steering capability parameters of the repeater, wherein the one or more parameters for mechanical beam steering are based at least in part on the one or more mechanical beam steering capability parameters of the repeater.

Aspect 23: The method of Aspect 22, wherein the one or more mechanical beam steering capability parameters of the repeater comprise at least one of: a horizontal rotation range of the repeater, a vertical rotation range of the repeater, a horizontal rotation adjustment step size, a vertical rotation adjustment step size, or a time duration for performing mechanical beam steering based at least in part on the one or more parameters for mechanical beam steering. Aspect 24: The method of any of Aspects 18-23, wherein identifying the one or more parameters for mechanical beam steering comprises: performing one or more measurements; and identifying the one or more parameters for mechanical beam steering based at least in part on results of the one or more measurements.

Aspect 25: The method of Aspect 24, wherein performing the one or more measurements comprises at least one of: performing the one or more measurements for different mechanically adjusted azimuth positions of the repeater, performing the one or more measurements for different mechanically adjusted elevation angles of the repeater, performing the one or more measurements for different electrically adjusted phase offsets, or performing one or more sensor measurements. Aspect 26: The method of Aspect 24 or 25, wherein performing the one or more measurements comprises: performing the one or more measurements for different mechanically adjusted azimuth positions of the repeater in a particular azimuth position adjustment pattern.

Aspect 27: The method of any of Aspects 24-26, wherein performing the one or more measurements comprises: performing the one or more measurements for different mechanically adjusted elevation angles of the repeater in a particular elevation angle adjustment pattern. Aspect 28: The method of any of Aspects 24-27, wherein performing the one or more measurements comprises: performing the one or more measurements as a part of an access procedure with a base station.

Aspect 29: The method of any of Aspects 24-28, wherein performing the one or more measurements comprises: performing the one or more measurements as a part of recovery procedure for a beam or link failure event. Aspect 30: The method of any of Aspects 18-29, wherein performing mechanical beam steering based at least in part on the one or more parameters comprises at least one of: adjusting an azimuth position of the repeater based at least in part on the one or more parameters, or adjusting an elevation angle of the repeater based at least in part on the one or more parameters.

Aspect 31: The method of any of Aspects 18-30, further comprising: receiving, after performing mechanical beam steering based at least in part on the one or more parameters, a radio frequency (RF) analog signal from a first wireless communication device; and forwarding the RF analog signal to a second wireless communication device. Aspect 32: The method of Aspect 31, wherein receiving the RF analog signal comprises: receiving the RF analog signal on a millimeter wave frequency; and wherein forwarding the RF analog signal comprises: forwarding the RF analog signal on the millimeter wave frequency.

Aspect 33: The method of Aspect 31 or 32, wherein the first communication device is a base station (BS); and wherein the method further comprises: receiving an indication of the one or more parameters for mechanical beam steering from the BS. Aspect 34: The method of any of Aspects 31-33, wherein the second communication device is a base station (BS); and wherein the method further comprises: receiving an indication of the one or more parameters for mechanical beam steering from the BS. Aspect 35: The method of any of Aspects 31-34, wherein at least one of: receiving the RF analog signal comprises: performing electrical beamforming for a receive beam of the repeater; and receiving the RF analog signal using the receive beam after performing electrical beamforming for the receive beam; or transmitting the RF analog signal comprises: performing electrical beamforming for a transmit beam of the repeater;

and forwarding the RF analog signal using the transmit beam after performing electrical beamforming for the transmit beam.

Aspect 36: A method of wireless communication performed by a base station (BS), comprising: identifying one or more parameters for mechanical beam steering for a repeater; and transmitting, to the repeater, an indication of the one or more parameters for mechanical beam steering.

Aspect 37: The method of Aspect 36, wherein transmitting the indication of the one or more parameters for mechanical beam steering comprises: transmitting the indication of the one or more parameters for mechanical beam steering in a mechanical beam steering configuration. Aspect 38: The method of Aspect 37, wherein the BS is communicatively connected with the repeater via a control interface; and wherein transmitting the indication of a mechanical beam steering configuration comprises: transmitting the indication of a mechanical beam steering configuration in a control command via the control interface.

Aspect 39: The method of any of Aspects 36-38, further comprising: receiving, from the repeater, an indication of one or more mechanical beam steering capability parameters of the repeater; and wherein identifying the one or more parameters for mechanical beam steering comprises: identifying the one or more parameters for mechanical beam steering based at least in part on the one or more mechanical beam steering capability parameters. wherein identifying the one or more parameters for mechanical beam steering comprises: identifying the one or more parameters for mechanical beam steering based at least in part on the one or more mechanical beam steering capability parameters. Aspect 40: The method of Aspect 39, wherein the one or more mechanical beam steering capability parameters of the repeater comprise at least one of: an azimuth position range of the repeater, an elevation angle range of the repeater, an azimuth position adjustment step size, an elevation angle adjustment step size, or a time duration for performing mechanical beam steering based at least in part on the one or more parameters for mechanical beam steering.

Aspect 41: An apparatus for wireless communication at a device, comprising a processor; memory coupled with the processor; and instructions stored in the memory and executable by the processor to cause the apparatus to perform the method of one or more Aspects of Aspects 1-40. Aspect 42: A device for wireless communication, comprising a memory and one or more processors coupled to the memory, the memory and the one or more processors configured to perform the method of one or more Aspects of Aspects 1-40.

Aspect 43: An apparatus for wireless communication, comprising at least one means for performing the method of one or more Aspects of Aspects 1-40. Aspect 44: A non-transitory computer-readable medium storing code for wireless communication, the code comprising instructions executable by a processor to perform the method of one or more Aspects of Aspects 1-40. Aspect 45: A non-transitory computer-readable medium storing a set of instructions for wireless communication, the set of instructions comprising one or more instructions that, when executed by one or more processors of a device, cause the device to perform the method of one or more Aspects of Aspects 1-40.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a repeater, comprising:
   receiving, from a base station (BS) or a network controller in a wireless network, an indication of a plurality of pairs of mechanical beam steering configurations and electrical beam steering configurations, each of the mechanical beam steering configurations comprising one or more parameters for mechanical beam steering and each of the electrical beam steering configurations comprising one or more parameters for electrical beamforming;

performing mechanical beam steering based at least in part on the one or more parameters for mechanical beam steering; and performing electrical beamforming based at least in part on the one or more parameters for electrical beamforming.

2. The method of claim 1, wherein the repeater is communicatively connected with the BS via a control interface; and
wherein receiving the indication comprises:
receiving the indication in a control command via the control interface.

3. The method of claim 1, wherein receiving the indication comprises:
receiving the indication in an application layer message from the network controller.

4. The method of claim 1, further comprising:
transmitting, to the BS, an indication of one or more mechanical beam steering capability parameters of the repeater,
wherein the one or more parameters for mechanical beam steering are based at least in part on the one or more mechanical beam steering capability parameters of the repeater.

5. The method of claim 4, wherein the one or more mechanical beam steering capability parameters of the repeater comprise at least one of:
a horizontal rotation range of the repeater,
a vertical rotation range of the repeater,
a horizontal rotation adjustment step size,
a vertical rotation adjustment step size, or
a time duration for performing mechanical beam steering based at least in part on the one or more parameters for mechanical beam steering.

6. A method of wireless communication performed by a repeater, comprising:
communicating, using a plurality of pairs of mechanical beam steering configurations and electrical beam steering configurations, a plurality of first radio frequency (RF) analog signals based at least in part on a plurality of mechanical beam steering parameters and a plurality of electrical beamforming parameters;
performing, based at least in part on a first subset of the plurality of mechanical beam steering parameters, mechanical beam steering for at least one of a transmit beam of the repeater or a receive beam of the repeater;
performing, based at least in part on a second subset of the plurality of electrical beamforming parameters, electrical beamforming for at least one of the transmit beam or the receive beam; and
communicating a second RF analog signal using at least one of the transmit beam or the receive beam after performing the mechanical beam steering and the electrical beamforming.

7. The method of claim 6, further comprising:
performing one or more measurements of the plurality of first RF analog signals; and
identifying the first subset and the second subset based at least in part on results of the one or more measurements.

8. The method of claim 7, wherein performing the one or more measurements comprises at least one of:

performing the one or more measurements for different mechanically adjusted azimuth positions of the repeater,
performing the one or more measurements for different mechanically adjusted elevation angles of the repeater,
performing the one or more measurements for different electrically adjusted phase offsets, or
performing one or more sensor measurements.

9. The method of claim 7, wherein performing the one or more measurements comprises:
performing the one or more measurements for different mechanically adjusted azimuth positions of the repeater in a particular azimuth position adjustment pattern.

10. The method of claim 7, wherein performing the one or more measurements comprises:
performing the one or more measurements for different mechanically adjusted elevation angles of the repeater in a particular elevation angle adjustment pattern.

11. The method of claim 7, wherein performing the one or more measurements comprises:
performing the one or more measurements as a part of an access procedure with a base station (BS).

12. The method of claim 7, wherein performing the one or more measurements comprises:
performing the one or more measurements as a part of recovery procedure for a beam or link failure event.

13. The method of claim 6, wherein performing the mechanical beam steering based at least in part on the first subset comprises at least one of:
adjusting an azimuth position of the repeater based at least in part on the first subset, or
adjusting an elevation angle of the repeater based at least in part on the first subset.

14. The method of claim 6, wherein communicating the second RF analog signal comprises:
receiving, after performing the mechanical beam steering based at least in part on the first subset, the second RF analog signal from a first wireless communication device; and
forwarding the second RF analog signal to a second wireless communication device.

15. The method of claim 14, wherein at least one of:
receiving the second RF analog signal comprises:
receiving the second RF analog signal using the receive beam after performing the electrical beamforming based at least in part on the second subset; or
forwarding the second RF analog signal comprises:
forwarding the second RF analog signal using the transmit beam after performing the electrical beamforming based at least in part on the second subset.

16. The method of claim 6, further comprising:
receiving, from a base station (BS) or a core network device in a wireless network, an indication of a mechanical beam steering configuration and an indication of an electrical beamforming configuration;
identifying the first subset in the mechanical beam steering configuration; and
identifying the second subset in the electrical beamforming configuration.

17. The method of claim 6, wherein the plurality of mechanical beam steering parameters are included in the mechanical beam steering configurations;
wherein the plurality of electrical beamforming parameters are included in the electrical beamforming configurations;

wherein the plurality of pairs include the mechanical beam steering configurations and the electrical beamforming configurations; and wherein the method further comprises:
identifying a pair of a mechanical beam steering configuration and an electrical beamforming configuration from the plurality of pairs,
wherein the mechanical beam steering configuration includes the first subset, and
wherein the electrical beamforming configuration includes the second subset.

18. A repeater for wireless communication, comprising:
a memory; and
one or more processors coupled to the memory, the one or more processors configured to:
receive, from a base station (BS) or a network controller in a wireless network, an indication of a plurality of pairs of mechanical beam steering configurations and electrical beam steering configurations, each of the mechanical beam steering configurations comprising one or more parameters for mechanical beam steering and each of the electrical beam steering configurations comprising one or more parameters for electrical beamforming;
perform mechanical beam steering based at least in part on the one or more parameters for mechanical beam steering; and
perform electrical beamforming based at least in part on the one or more parameters for electrical beamforming.

19. The repeater of claim 18, wherein the repeater is communicatively connected with the BS via a control interface; and
wherein the memory and the one or more processors, when receiving the indication, are configured to:
receive the indication in a control command via the control interface.

20. The repeater of claim 18, wherein the memory and the one or more processors, when receiving the indication, are configured to:
receive the indication in an application layer message from the network controller.

21. The repeater of claim 18, wherein the memory and the one or more processors are further configured to:
transmit, to the BS, an indication of one or more mechanical beam steering capability parameters of the repeater,
wherein the one or more parameters for mechanical beam steering are based at least in part on the one or more mechanical beam steering capability parameters of the repeater.

22. The repeater of claim 21, wherein the one or more mechanical beam steering capability parameters of the repeater comprise at least one of:
a horizontal rotation range of the repeater,
a vertical rotation range of the repeater,
a horizontal rotation adjustment step size,
a vertical rotation adjustment step size, or
a time duration for performing mechanical beam steering based at least in part on the one or more parameters for mechanical beam steering.

23. A repeater for wireless communication, comprising:
a memory; and
one or more processors coupled to the memory, the one or more processors configured to:
communicate, using a plurality of pairs of mechanical beam steering configurations and electrical beam steering configurations, a plurality of first radio frequency (RF) analog signals based at least in part on a plurality of mechanical beam steering parameters and a plurality of electrical beamforming parameters;
perform, based at least in part on a first subset of the plurality of mechanical beam steering parameters, mechanical beam steering for at least one of a transmit beam of the repeater or a receive beam of the repeater;
perform, based at least in part on a second subset of the plurality of electrical beamforming parameters, electrical beamforming for at least one of the transmit beam or the receive beam; and
communicate a second RF analog signal using at least one of the transmit beam or the receive beam after performing the mechanical beam steering and the electrical beamforming.

24. The repeater of claim 23, wherein the one or more processors are further configured to:
receive, from a base station (BS) or a core network device in a wireless network, an indication of a mechanical beam steering configuration; and
identify the first subset in the mechanical beam steering configuration.

25. The repeater of claim 23, wherein the one or more processors are further configured to:
perform one or more measurements of the plurality of first RF analog signals; and
identify the first subset and the second subset based at least in part on results of the one or more measurements.

26. The repeater of claim 25, wherein the one or more processors, when performing the one or more measurements, are configured to:
perform the one or more measurements for different mechanically adjusted azimuth positions of the repeater,
perform the one or more measurements for different mechanically adjusted elevation angles of the repeater,
perform the one or more measurements for different electrically adjusted phase offsets, or perform one or more sensor measurements.

27. The repeater of claim 25, wherein the one or more processors, when performing the one or more measurements, are configured to:
perform the one or more measurements for different mechanically adjusted azimuth positions of the repeater in a particular azimuth position adjustment pattern.

28. The repeater of claim 25, wherein the one or more processors, when performing the one or more measurements, are configured to:
perform the one or more measurements for different mechanically adjusted elevation angles of the repeater in a particular elevation angle adjustment pattern.

29. The repeater of claim 25, wherein the one or more processors, when performing the one or more measurements, are configured to:
perform the one or more measurements as a part of an access procedure with a base station.

30. The repeater of claim 25, wherein the one or more processors, when performing the one or more measurements, are configured to:
perform the one or more measurements as a part of recovery procedure for a beam or link failure event.

* * * * *